United States Patent
Ginis et al.

(10) Patent No.: US 8,902,958 B2
(45) Date of Patent: Dec. 2, 2014

(54) METHODS AND APPARATUS TO COMBINE DATA FROM MULTIPLE SOURCE TO CHARACTERIZE COMMUNICATION SYSTEMS

(75) Inventors: George Ginis, San Mateo, CA (US); Mark H. Brady, Palo Alto, CA (US); Stuart Lynch Blackburn, San Ramon, CA (US)

(73) Assignees: Adaptive Spectrum and Signal Alignment, Inc., Redwood City, CA (US); AT&T Intellectual Property I, L.P., Reno, NV (US)

( * ) Notice: Subject to any disclaimer, the term of this patent is extended or adjusted under 35 U.S.C. 154(b) by 862 days.

(21) Appl. No.: 12/226,910

(22) PCT Filed: Apr. 27, 2007

(86) PCT No.: PCT/US2007/067717
§ 371 (c)(1), (2), (4) Date: Oct. 31, 2008

(87) PCT Pub. No.: WO2007/130877
PCT Pub. Date: Nov. 15, 2007

(65) Prior Publication Data
US 2009/0161741 A1 Jun. 25, 2009

Related U.S. Application Data

(60) Provisional application No. 60/796,371, filed on May 1, 2006.

(51) Int. Cl.
*H04B 3/46* (2006.01)
*H04B 1/10* (2006.01)
*H04M 1/24* (2006.01)

(52) U.S. Cl.
USPC .................. 375/224; 375/254; 379/27.01

(58) Field of Classification Search
USPC .................................................. 370/252
See application file for complete search history.

(56) References Cited

U.S. PATENT DOCUMENTS

| | | | |
|---|---|---|---|
| 6,177,801 B1 * | 1/2001 | Chong | 324/520 |
| 6,970,560 B1 * | 11/2005 | Hench et al. | 379/417 |
| 7,536,595 B1 * | 5/2009 | Hiltunen et al. | 714/26 |
| 2003/0147466 A1 * | 8/2003 | Liang | 375/240.12 |
| 2006/0280236 A1 | 12/2006 | Rhee et al. | |
| 2007/0124652 A1 * | 5/2007 | Litsyn et al. | 714/776 |
| 2007/0133987 A1 * | 6/2007 | Xu et al. | 398/67 |
| 2009/0007185 A1 * | 1/2009 | Nix et al. | 725/62 |

FOREIGN PATENT DOCUMENTS

| | | |
|---|---|---|
| WO | WO-0135609 | 5/2001 |
| WO | WO-2006131791 | 12/2006 |

OTHER PUBLICATIONS

Patent Cooperation Treaty, International Search Report & Written Opinion, PCT Application No. PCT/US2007/067717, (Nov. 28, 2007).
Patent Cooperation Treaty, International Preliminary Report on Patentability, PCT Application No. PCT/US2007/067717, (Nov. 13, 2008).
Non-Final Office Action for Chinese Patent Application No. 200780019309.3, Mailed Jun. 9, 2011, 10 pages.

\* cited by examiner

*Primary Examiner* — Brandon Renner
(74) *Attorney, Agent, or Firm* — Blakely, Sokoloff, Taylor & Zafman LLP

(57) ABSTRACT

A data collector combiner, a network management system, a DSL Optimizer (DSLO), or any combination thereof collects data, parameter(s), characteristic(s), information, or any combination thereof from two or more data sources. The data collector probabilistically combines at least the first and second data to estimate at least one DSL characterizing parameter.

28 Claims, 12 Drawing Sheets

METHODS AND APPARATUS TO COMBINE DATA FROM MULTIPLE SOURCE TO CHARACTERIZE COMMUNICATION SYSTEMS

RELATED APPLICATIONS

This patent application claims priority from U.S. Provisional Application Ser. No. 60/796,371, entitled "DSL System" which was filed on May 1, 2006. U.S. Provisional Application Ser. No. 60/796,371 is hereby incorporated by reference in its entirety.

CROSS REFERENCE TO RELATED APPLICATIONS

This application is a U.S. National Phase application under 35 U.S.C. §371 of International Application No. PCT/US2007/067717, filed Apr. 27, 2007, entitled METHODS AND APPARATUS TO COMBINE DATA FROM MULTIPLE SOURCES TO CHARACTERIZE COMMUNICATION SYSTEMS.

FIELD OF THE DISCLOSURE

This disclosure relates generally to communications networks, systems, or any combination thereof and, more particularly, to methods and apparatus to combine data from multiple sources to characterize and diagnose the communication systems or networks.

BACKGROUND

Digital subscriber line (DSL) technology is commonly used to provide Internet related services to subscribers, such as, for example, homes and businesses (also referred to herein as users, subscribers or customers). DSL technology enables customers to utilize telephone lines (e.g., ordinary twisted-pair copper telephone lines used to provide Plain Old Telephone System (POTS) services) to connect the customer to, for example, a high data rate broadband Internet network, broadband service and broadband content.

A service provider of a DSL service can utilize information concerning the status, characteristics or performance of a telephone line or DSL equipment for a wide range of purposes such as, maintenance, service quality assurance, monitoring, trouble detection, trouble isolation, or trouble prevention. Alternatively, it may be useful to have similar information concerning the telephone line or DSL equipment prior to or during an offering, selling or provisioning of DSL service to a potential or new DSL subscriber. Example status, characteristics or performance information or data includes loop length, cable gauge(s), presence of bridged tap(s), location of bridged tap(s), lengths of bridged tap(s), noise on the line, shorts, opens, data rates, channel transfer functions, channel attenuation, signal-to-noise ratios, loop impedance, error rates, etc. Information such as that mentioned above is measured for the telephone line between the service provider's location and the subscriber's location or for the DSL equipment used to provide the DSL service to the subscriber.

DSL networks and systems measure, compute or estimate such status, characteristic or performance information using a variety of sources such as system(s), sub-system(s), method(s), server(s), protocol(s), algorithm(s) or technique(s). Such status, characteristics or performance information or data may be collected from multiple sources, which on the one hand can increase the available data, but on the other hand can complicate the analysis steps. Previous solutions to this problem either ignore the availability of data from multiple sources, or use simplistic models ignoring uncertainty factors for combining such data, which can often lead to unreliable analysis results. Also, previous solutions do not provide information with respect to the level of confidence for a certain result. As a result, these networks and systems do not measure, compute or estimate status, characteristic or performance information using two or more sources. Further, these networks and systems use simplistic models for combining data that do not estimate performance and as such, these models lead to unreliable results.

DETAILED DESCRIPTION

A data collector combiner, a network management system, a DSL Optimizer (DSLO), or any combination thereof, collects data, parameter(s), characteristic(s), information, or any combination thereof, from two or more data sources. The data collector probabilistically combines at least the first and second data to estimate at least one DSL characterizing parameter.

The collected or received data, parameter(s), characteristic(s), information, or any combination thereof may be checked for integrity, checked for consistency, may be pre-processed, stored in one or more data stores, or any combination thereof. According to one embodiment, the DSLO combines data from the data stores based upon any of a variety of rules, heuristics, or any combination thereof. Data from the data stores, data that has been heuristically combined, or any combination thereof may, additionally or alternatively, be probabilistically or statistically combined. For example, the data collector combiner may apply Bayes' theorem to infer any of a variety of parameter(s), characteristic(s), data related to the configuration, operation, environment, customer satisfaction, faults, errors, etc. for the DSL system, or any combination thereof.

According to one embodiment, the data collector combiner combines DSL parameter and characteristic information from multiple sources to optimize the DSL network in a reliable and consistent manner. According to one embodiment, the combination of DSL parameter and characteristic information may take into account uncertainty factors. For example, uncertainty factors may be caused by variations among system implementations, deviations from ideal models, measurement errors, errors in configuring the systems, the impact of unknown environmental parameters, and implementations that do not conform to known standards. As a result, the data collector combiner and the network management system makes use of "probabilistic" reasoning that is superior to conventional systems using mere "logical" reasoning.

Figure 1:
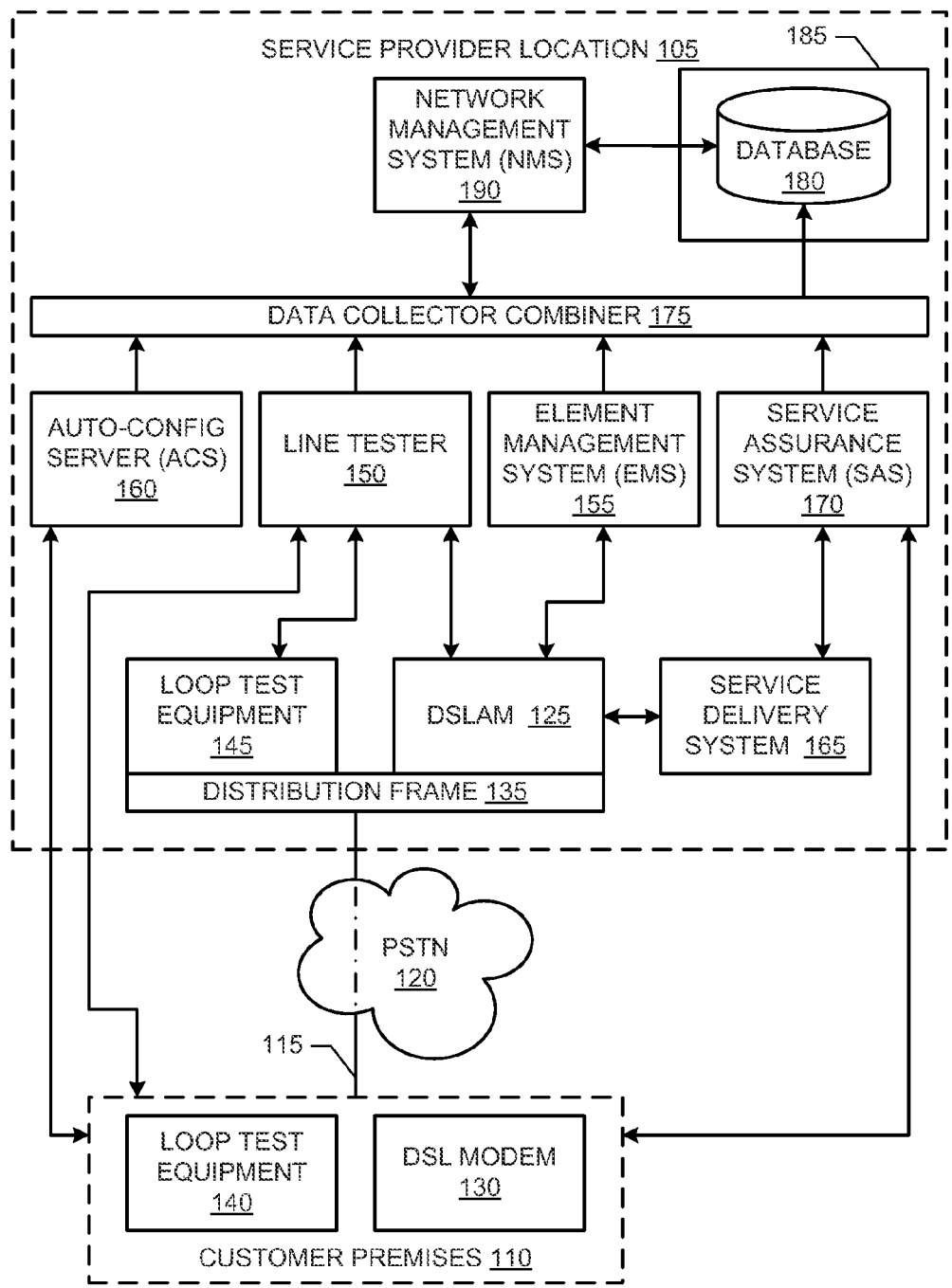
FIG. 1 is a schematic illustration of an example apparatus to combine data from multiple data sources to infer characteristics of a DSL communication system.

While the following disclosure references the example digital subscriber line (DSL) system of FIG. 1, the methods and apparatus described herein may be used to estimate, determine or infer characteristics or parameters for telephone lines, DSL equipment for any variety, any size and any topology of a DSL system, network, or any combination thereof. For example, a DSL system may include any number of customer premises, more than one DSL access multiplexer (DSLAM) located in more than one location, or may include any number of telephone lines, DSL modems, servers, systems, data sources, data collectors, data stores, data combiners, data collector combiners, or any combination thereof. Additionally, although for purpose of explanation, the following disclosure refers to the example DSL system illustrated in FIG. 1, any additional or alternative variety or number of communication systems, devices, network(s), or any combination thereof may be used to implement a DSL communication system, provide DSL communication services, estimate characteristics or parameters for telephone lines or DSL equipment in accordance with the teachings disclosed herein. For example, the different functions collectively allocated among a DSL modem, a DSLAM, loop test equipment, auto-configuration server (ACS), line tester, element management system (EMS), service assurance system (SAS), service delivery system, data collector combiner, or network management system (NMS) as described below can be reallocated in any desired manner.

As used herein, the terms "user", "subscriber" or "customer" refer to a person, business or organization to which communication services or equipment are or may potentially be provided by any of a variety of service provider(s). Further, the term "customer premises" refers to the location to which communication services are being provided by a service provider. For an example public switched telephone network (PSTN) used to provide DSL services, customer premises are located at the network termination (NT) side of the telephone lines. Example customer premises include a residence or an office building. Likewise, the term "service provider location" refers to a location from which DSL services are provided or a location in which systems or equipment related to the providing of DSL services are located. Such systems or equipment related to the providing of DSL services may be owned or controlled by a single operating company or may be owned or controlled by multiple companies. Example service provider locations include a central office, a remote terminal, a communication vault, a telephone pedestal, a customer service office, a maintenance office, a sales office, or any combination thereof. The term "service provider location" may refer to multiple physical locations where equipment is installed, and where such equipment are communicatively coupled. Further still, the term "service provider" refers to any of a variety of entities that provide, sell, provision, troubleshoot, or maintain any combination of communication services or communication equipment. Example service providers include a telephone operating company, a cable operating company, a wireless operating company, or an Internet service provider.

As used herein, the term "subscriber equipment" refers to any equipment located in a customer premises for use in providing at least one subscriber service. The subscriber equipment may or may not be potentially available for additional purposes. While subscriber equipment is located in a customer premises, such equipment may be located on either side or both sides of a NT or any other network ownership demarcation. Such subscriber equipment may be owned, rented, borrowed or leased by a subscriber, or accessible to obtain the service. For example, subscriber equipment could be owned by a service provider and the subscriber only plugs into a connector and has no other access or interaction with the device. Subscriber equipment is generally available to or accessible by the subscriber and may be acquired or obtained by the subscriber via any of a variety of sources including, but not limited to, a retailer, a service provider, or an employer. Example subscriber equipment includes a personal computer (PC), a set-top box (STB), a residential gateway, a DSL modem, or any combination thereof located at a subscriber's residence by which the subscriber utilizes a DSL service and Internet services.

As used herein, the term "service provider equipment" refers to any equipment located in a service provider location for use in, for example, providing, provisioning, maintaining, selling, troubleshooting, or any combination thereof DSL services.

Additionally, as used herein, the term "DSL" refers to any of a variety or variant of DSL technology such as, for example, Asymmetric DSL (ADSL), High-speed DSL (HDSL), Symmetric DSL (SDSL), or Very high-speed DSL (VDSL). Such DSL technologies are commonly implemented in accordance with an applicable standard such as, for example, the International Telecommunications Union (ITU) standard G.992.1 (a.k.a. G.dmt) for ADSL modems, the International Telecommunications Union (ITU) standard G.992.3 (a.k.a. G.dmt.bis) for ADSL2 modems, the International Telecommunications Union (ITU) standard G.992.5 (a.k.a. G.adsl2plus) for ADSL2+ modems, the International Telecommunications Union (ITU) standard G.993.1 (a.k.a. G.vdsl) for VDSL modems, the International Telecommunications Union (ITU) standard G.993.2 for VDSL2 modems, the International Telecommunications Union (ITU) standard G.994.1 (G.hs) for modems implementing handshake, the ITU G.997.1 (a.k.a. G.ploam), or any combination of standards for management of DSL modems.

As used herein, the term "operative" describes an apparatus capable of an operation, actually in operation, or any combination thereof. For example, an apparatus operable to perform some function describes a device turned off yet is capable of performing an operation, by virtue of programming, or hardware for example, a device turned on and performing the operation, or any combination thereof. The term "signal" typically refers to an analog signal, the term "data" typically refers to digital data and the term "information" may refer to either an analog signal, a digital signal, or any combination thereof although other meanings may be inferred from the context of the usage of these terms.

In the interest of brevity and clarity, throughout the following disclosure references will be made to implementing a DSL communication system, providing DSL communication services, estimating, determining, inferring characteristics or parameters for telephone lines and DSL equipment, or any combination thereof. However, while the following disclosure is made with respect to example digital subscriber line (DSL) equipment, DSL services, DSL systems and the use of ordinary twisted-pair copper telephone lines for distribution of DSL services, it should be understood that the disclosed methods and apparatus to infer characteristics of communication systems and networks using data collected from multiple data sources disclosed herein are applicable to many other types or varieties of communication equipment, services, technologies, systems, or any combination thereof. For example, the disclosed methods and apparatus may also be applicable to wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, any suitable network or system, or any combination thereof. Additionally, combinations of these devices, systems or networks may also be used. For example, a combination of twisted-pair and coaxial cable connected by a balun, or any other physical-channel-continuing combination such as an analog fiber to copper connection with linear optical-to-electrical connection at an optical network unit (ONU) may be used.

It will be readily apparent to persons of ordinary skill in the art that connecting a DSL modem to a customer involves, for example, communicatively connecting the DSL modem operated by a communications company to a telephone line (i.e., a subscriber line) that is communicatively connected to a second DSL modem located at a customer premises (e.g., a home or place of business owned, leased or otherwise utilized by the customer). The second DSL modem may be further communicatively connected to another communication, a computing device (e.g., a personal computer), or any combination thereof that the customer operates to access a service (e.g., Internet access) via the first and second DSL modems, the telephone line and the communications company.

According to one embodiment, the DSL system of FIG. 1 utilizes data, parameter(s), characteristic(s), or information collected or obtained from two or more data sources. The collected obtained data, parameter(s), characteristic(s), or information may be checked for integrity or consistency or may be pre-processed, and then stored in one or more data stores. In the illustrated example, data from the data stores is then compared or combined based upon any of a variety of rules and heuristics. Data from the data stores or data that has been heuristically combined may, additionally or alternatively, be probabilistically or statistically combined by applying, for example, Bayes' theorem to infer any of a variety of parameter(s), characteristic(s) or data related to the configuration, operation, environment, customer satisfaction, faults, errors, etc. for the example DSL system. For example, a characteristic of the DSL system can be inferred by applying Bayes' theorem given first and second data indicative of the characteristic and at least one conditional probability.

FIG. 1 illustrates an example DSL system that provides or may be used to provide DSL services from a service provider location 105 to an example customer premises 110. In the illustrated example, the DSL services are, or may be, provided to the example customer premises 110 via an ordinary twisted-pair copper telephone line 115. The example telephone line 115 of FIG. 1 is a part of a public switched telephone network (PSTN) 120.

To provide DSL services to the customer via the example telephone line 115, the example system of FIG. 1 includes any of a variety of DSLAMs 125 and any of a variety of DSL modems 130. The example DSLAM 125 of FIG. 1 implements, among other things, any of a variety or number of DSL modem(s) 130, one of which is, or may be, used to provide DSL service to the example customer premises 110 via the telephone line 115. To connect the example telephone line 115 to the example DSLAM 125, the example system of FIG. 1 includes a distribution frame 135 that implements a metallic cross-connect. Although not shown, any variety of plain old telephone system (POTS) splitter may, for example, be placed between the example telephone line 115 and the example DSLAM 125 and between the telephone line 115 and the example DSL modem 130 to facilitate simultaneous use of the telephone line 115 for DSL services and POTS services.

To measure, compute or otherwise determine any number or any of a variety of signals, data, information or parameter(s) that characterize, describe or indicate a status of the telephone line 115, the example system of FIG. 1 includes any of a variety of loop test equipment 140 located at the customer premises 110, any of a variety of loop test equipment 145 located at the service provider location 105, or any of a variety of line testers 150. In the illustrated example of FIG. 1, the example loop test equipment 145 is connected to the telephone line 115 via the distribution frame 135, and the example loop test equipment 140 is connected to the telephone wiring located in the customer premises 110 (i.e., an in-home distribution network). Additionally or alternatively, the example loop test equipment 145 may be implemented by or within the DSLAM 125.

Using any of a variety of method(s), protocol(s), communication path(s) or communication technology(ies), the example line tester 150 of FIG. 1 can configure, command or request that the example loop test equipment 140, 145 transmit any of a variety of line probing signals into the telephone line 115, or receive or measure signals present on the telephone line 115 with or without injecting a line probing signal. Such probing signals or signal receiving or measuring can be utilized by the example line tester 150, or the loop test equipment 140, 145 to perform any of a variety of single-ended or double-end line testing method(s), algorithm(s) or technique(s). Example probing signals include pulse or step time domain reflectometry (TDR) signals, spread spectrum signals, nominal modem transmission signals (e.g., a multi-carrier training signal for an ADSL modem), chirp signals, impulse trains, single impulse, or any suitable signals. Example methods and apparatus to transmit line probing signals or receive and measure signal(s) present on the telephone line 115 are described in U.S. patent application Ser. No. 60/796,371, filed on May 1, 2006, and U.S. patent application Ser. No. 12/226,911, filed on Mar. 17, 2010, which are hereby incorporated by reference in their entireties.

To measure noise conditions (e.g., quiet-line noise), no line probing signal need be transmitted (e.g., a zero-voltage, quiet, null, all zeros signal, or any combination thereof such that, effectively, no signal is transmitted into the telephone line 115). Thus, signals received or measured from the telephone line 115 represent noise present on the telephone line 115. Example environment variables 610 include noise characteristics such as noise power spectral density (PSD), noise source, noise strength, noise amplitude, noise type, background noise, impulse noise, impulse noise statistics, amplitude modulation (AM) noise, etc. or any suitable combination of noise characteristics. However, since transmission of probing signal(s) is not a prerequisite to measurement of line noise signals, noise measurement or characterization may be performed with or without the transmission of probing signals.

Using any of a variety of method(s), technique(s) or algorithm(s), signals received or measured by the example loop test equipment 140, 145 may be processed to estimate or determine any of a variety of estimated characterizing parameter(s) 204 (FIG. 2), data or information that characterize the telephone line 115. For example, (a) Time Domain Reflectometry (TDR) analysis may be performed on a reflected version of a transmitted impulse or pulse, or (b) with knowledge of what probing signal was transmitted, and given a received or measured reflected signal, a data analyzer can, for example, compute an echo path response or a channel transfer response. Time-domain reflectometry is a measurement technique to determine the characteristics of electrical lines by observing reflected waveforms in response to a transmitted (i.e. probe) signal. Example estimated characterizing parameters 204, data or information include, but are not limited to, channel insertion loss, channel transfer function, channel attenuation, cable gauge(s), cable fault, loop length, cable gauge(s), bridged tap presence, bridged tap location(s), bridged tap length(s), bridged tap gauge(s), open faults, short faults, cross faults, bad splice/connection presence/location/severity, noise, excessive noise, data rate, signal-to-noise ratio(s), loop impedance, loop attenuation or any suitable combinations of information.

In the illustrated example of FIG. 1, processing of signals received or measured by the example loop test equipment 140, 145 may be performed by any of a variety of computing device(s), platform(s), server(s), or any suitable combination thereof. For example, the loop test equipment 140, 145 may include logic or a processor to estimate or determine characterizing parameters based on the received or measured signals. Alternatively or additionally, a computing device communicatively coupled or couple-able to the loop test equipment 140 may perform the estimating or determining. For example, the example line tester 150 may obtain the received or measured signals from the loop test equipment 140, 145 and estimate or determine the parameters. Alternatively or additionally, subscriber equipment (e.g., a subscriber's personal computer (PC) or set-top box (STB)) may be used to estimate or determine the parameters.

In the illustrated example of FIG. 1, the received or measured signal(s), or characterizing parameter(s) determined, computed or estimated from the signal(s) are provided by the example loop tester 140, 145 to the example line tester 150 via any of a variety of method(s), network(s) or protocol(s). Any other device or system used to receive, measure signals, compute, or estimate parameters may, additionally or alternatively, provide the same to the example line tester 150. If there is a DSL connection available or operable between the DSL modem 130 and the DSLAM 125, the example loop test equipment 140 can provide the signal(s) or parameter(s) via the DSL service using, for example, the exchange protocol defined in the ITU G.994.1 (a.k.a. G.hs) standard. Additionally or alternatively, the signal(s) or parameter(s) may be sent or provided to the example line tester 150 via an alternative or additional Internet connection or via the PSTN 120 using, for example, a dial-up or voice-band modem located at the customer premises 110. The example loop test equipment 140 may, additionally or alternatively, provide the signal(s) or parameter(s) to or via any of a variety of intermediary server(s) or service(s) such as, for example, an (Automatic configuration server) ACS 160 as defined in the DSL Forum document TR-069. If the example loop test equipment 140 is not currently communicatively coupled or coupleable to the example service provider location 105, the signal(s) or parameter(s) may be sent or provided via any of a variety of additional or alternative methods such as, for example, storing the characterizing parameter(s) on a CD or other non-volatile storage medium (e.g., a DVD) that can be sent or delivered to the DSL service provider and then loaded into the line tester 150. Additionally or alternatively, the example loop test equipment 140 can display the parameter(s) in, for example, the form of a condensed ASCII code using any of a variety of graphical user interfaces (GUI) displayed for or presented to a person. The example person can in turn vocally provide the parameter(s) to a technician or customer service representative (e.g., via a voice telephone call) who in turns loads the provided parameter(s) into the line tester 150. The person may be, for example, a subscriber or technician. The example loop test equipment 145 may be communicatively coupled to the example line tester 150 via any of a variety of interface(s), communication bus(es), backplane(s), fiber optic, copper cable(s), protocol(s) or combination of communication technology(ies).

To monitor, measure or record current or historical DSL performance characteristics for DSL communications occurring between the example DSLAM 125 and the DSL modem 130, the example DSL system of FIG. 1 includes an EMS 155. DSL performance data, statistics or information for ongoing DSL services can be measured or reported to the EMS 155 by the example DSL modem 130 or the DSLAM 125 using any of a variety of well known techniques. For example, they can be measured based on the ITU G.992.1 (a.k.a. G.dmt) standard or based on the ITU G.997.1 (a.k.a. G.ploam) standard for management of DSL modems. Example performance data, statistics or information include, but are not limited to, EMS data, EMS status, HLOG, HLIN, QLN (quiet line noise), SNR, LATN (line attenuation), SATN (signal attenuation), noise, channel attenuation, data rate, ATTNDR (attainable data rate), margin, CV (code violations), FEC (forward-error-correction) counts, ES (errored seconds), SES (severely errored seconds), UAS (unavailable seconds), BITS (bit distribution), GAINS (fine gains), TSSI (transmit spectral shaping), MREFPSD (reference PSD), transmitted power, transmitted PSD, failures, initialization counts, actual delay, actual impulse noise protection, forward error correction (FEC) and interleaving data, impulse noise sensor data, a number of FEC errors, margin information, data rate information, a channel transfer function, loop attenuation information, bit allocation information, or any suitable performance information. Performance information related to DSL physical layer characteristics, or DSL-PHY-characterizing data include SNR, bit distribution, data rate, margin, attainable data rate, or any suitable information. In the example of FIG. 1, DSL performance data, statistics, information, or any combination is sent by the example DSL modem 130 via the DSL service using, for example, the exchange protocol defined in the ITU G.994.1 (a.k.a. G.hs) standard. Additionally or alternatively, the DSL performance data, statistics or information may be sent by the DSL modem 130 via a transmission control protocol (TCP)/Internet protocol (IP) connection to the ACS 160 as defined in the DSL Forum document TR-069.

To provide any of a variety of services such as, for example, IP television (IPTV), video-on-demand (VoD), or voice-over-IP (VoIP) to the example customer premises 110, the example system of FIG. 1 includes any of a variety of service delivery systems 165. To monitor the quality, performance or characteristics of services provided by the example service delivery system 165, the example system of FIG. 1 includes a SAS 170. The example SAS 170 of FIG. 1 can monitor, for example, motion picture experts group (MPEG) statistics (e.g., frame losses, etc.), a packet loss rate, etc.

As described above, the example ACS 160, the example line tester 150, the example EMS 155 or the example SAS 170 represent sources of data indicative of past, ongoing or possible future DSL services provided or provide-able by the service delivery system 165, the DSLAM 125, the DSL model 130 via the telephone line 115, or any combination thereof. As described above, the example data sources 150, 155, 160 or 170 may contain data measured, collected, estimated or determined at either one of or both ends of the example telephone line 115. The example data sources 150, 155, 160 and 170 of FIG. 1 may collect or report data or information on a periodic or aperiodic basis. Additionally or alternatively, data may be collected or reported in response to a request for data or information. Data or information collected by the data sources 150, 155, 160, 170 may represent current or any combination of past snapshot(s) of the example DSL system of FIG. 1.

Persons of ordinary skill in the art will readily appreciate that data or information collected, acquired, measured, computed, estimated or received by the example data sources 150, 155, 160, 170 may be affected by any of a variety of factors such as, relevance, completeness, reliability, accuracy or timeliness (e.g., recent versus out of date). Some of the example data sources 150, 155, 160 170 have inherently higher accuracy or reliability and, thus, may be more useful in the determination of particular parameters related to the example DSL system of FIG. 1. For example, TDR data contained in the example line tester 150 may be more accurate or more useful for detecting or parameterization of a bridged tap than channel attenuation data or a channel transfer function available in the EMS 155.

In the illustrated example, two of the data sources 150, 155, 160, 170 may include related, similar or possibly incomplete data. For example, (a) the example ACS 160 may contain ACS data 645 that represents the channel attenuation for a first portion of frequencies (e.g., the downstream channel), while the EMS 155 contains EMS data 640 that represents the channel attenuation for a second portion of frequencies (e.g., the upstream channel) or (b) a bridged tap can be detected using related information from a channel transfer function contained in the ACS 160 or a TDR response contained in the line tester 150. Further, while the ACS 160 and the EMS 155 may both contain channel attenuation data, they may obtain or store the data with a different accuracy or representation. Examples of ACS data 645 also include: ACS status, HLOG, HLIN, QLN (quiet line noise), SNR, LATN (line attenuation), SATN (signal attenuation), noise, channel attenuation, data rate, ATTNDR (attainable data rate), margin, CV (code violations), FEC (forward-error-correction) counts, ES (errored seconds), SES (severely errored seconds), UAS (unavailable seconds), BITS (bit distribution), GAINS (fine gains), TSSI (transmit spectral shaping), MREFPSD (reference PSD), transmitted power, transmitted PSD, failures, initialization counts, actual delay, actual impulse noise protection, FEC and interleaving data, impulse noise sensor data, any other suitable data or any combination thereof. Other examples will abound to persons of ordinary skill in the art.

While example data sources 150, 155, 160 and 170 are illustrated in FIG. 1, persons of ordinary skill in the art will readily understand that a DSL system may include additional or alternative data sources than those illustrated in FIG. 1 or may include more than one of any or all of the illustrated data sources. Further, while this disclosure describes particular pieces of data or information being contained or available via particular ones of the example data sources 150, 155, 160, 170 of FIG. 1, persons of ordinary skill in the art will readily recognize that a DSL service provider may utilize any of a variety of combinations of data or information and data sources.

For a DSL system or network containing more than one telephone line, DSLAM 125 or DSL modem 130, the example data sources 150, 155, 160, 170 of FIG. 1 contain data associated with each telephone line 115, DSLAM 125 or DSL modem 130. However, the set of data contained in the data sources 150, 155, 160, 170 may differ, for example, from telephone line to telephone line, DSLAM to DSLAM, DSL modem to DSL modem, or subscriber to subscriber, for any of a variety of reasons such as, for example, how long a DSL service has been active, the type or manufacturer of a DSL modem, types of services utilized or subscribed to, location of a customer premises, etc.

To determine any of a variety of parameter(s), data or information based on data contained in the example data sources 150, 155, 160, 170, the example system of FIG. 1 includes a data collector combiner 175. The example data collector combiner 175 of FIG. 1 collects, receives or obtains data from one or more of the example data sources 150, 155, 160, 170, checks the integrity of the data, and checks the consistency of the data. If data is collected from more than one of the data sources 150, 155, 160, 170, the example data collector combiner 175 heuristically, logically, statistically or probabilistically combines the checked data. An example implementation of the data collector combiner 175 is discussed below in connection with FIGS. 2-5.

The example data collector combiner 175 of FIG. 1 combines data from the example data sources 150, 155, 160, 170 to infer parameters or characteristics of the example DSL system of FIG. 1. Example methods of parameter or characteristic inferring are discussed below in connection with FIGS. 6-12.

In the illustrated example, parameter(s), data or information inferred, estimated, computed or determined by the example data collector combiner 175 are stored in an example database 180 using any of a variety of data structure(s), data table(s), data array(s), etc. The example database 180 is stored in a machine accessible file or in any of a variety of memory 185.

To control, monitor, maintain or provision the example DSL system of FIG. 1, or to allow a person such as a customer service representative, a sales person or a technician to control, monitor, maintain or provision the example DSL system of FIG. 1, the illustrated example system includes an Network Management System (NMS) 190. The example NMS 190 of FIG. 1 uses, provides or makes available to a person the parameter(s), data or information stored in the example database 180. Alternately or additionally, the example NMS 190 of FIG. 1 may directly provide or makes available the parameter(s), data or information inferred, estimated, computed or determined by the example data collector combiner 175. For example, the NMS 190 can provide a GUI by which a technician can retrieve a value representative of a bit error rate, set a coding parameters etc., or configure or provision a parameter of the example DSL system.

Figure 2:
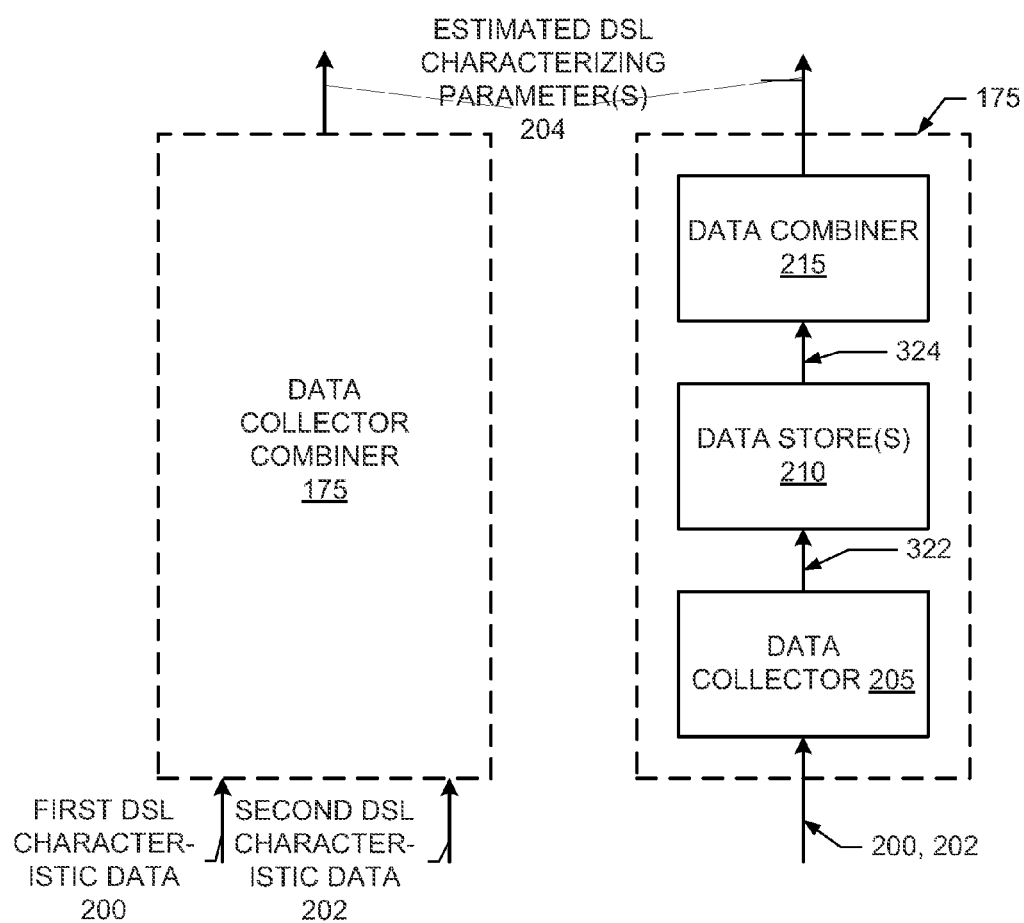
FIG. 2 illustrates the example data collector combiner of FIG. 1.

FIG. 2 illustrates an example block diagram and manner of implementing the example data collector combiner 175 of FIG. 1. As shown on the left side of FIG. 2, the data collector combiner 175 receives at least first characteristic data 200 and second characteristic data 202 and in response produces an estimated characterizing parameter(s) 204 as previously described. As shown on the right side of FIG. 2, to collect, check or pre-process at least first characteristic data 200 and second characteristic data 202 from the example data sources 150, 155, 160, 170, the example data collector combiner 175 of FIG. 2 includes a data collector 205. An example data collector 205 is discussed below in connection with FIGS. 3 and 13.

To store data collected, checked or pre-processed by the example data collector 205, the example data collector combiner 175 of FIG. 2 includes data store(s) 210. Example data store(s) 210 are discussed below in connection with FIG. 4.

To logically, heuristically, statistically or probabilistically combine data from one or more sources, the example data collector combiner 175 of FIG. 2 includes a data combiner 215. The data combiner 215 combines at least the first characteristic data 200 and the second characteristic data 202 from more than one source, and in response produces an estimated characterizing parameter(s) 204. An example data combiner 215 is discussed below in connection with FIGS. 5 and 14.

Figure 3:
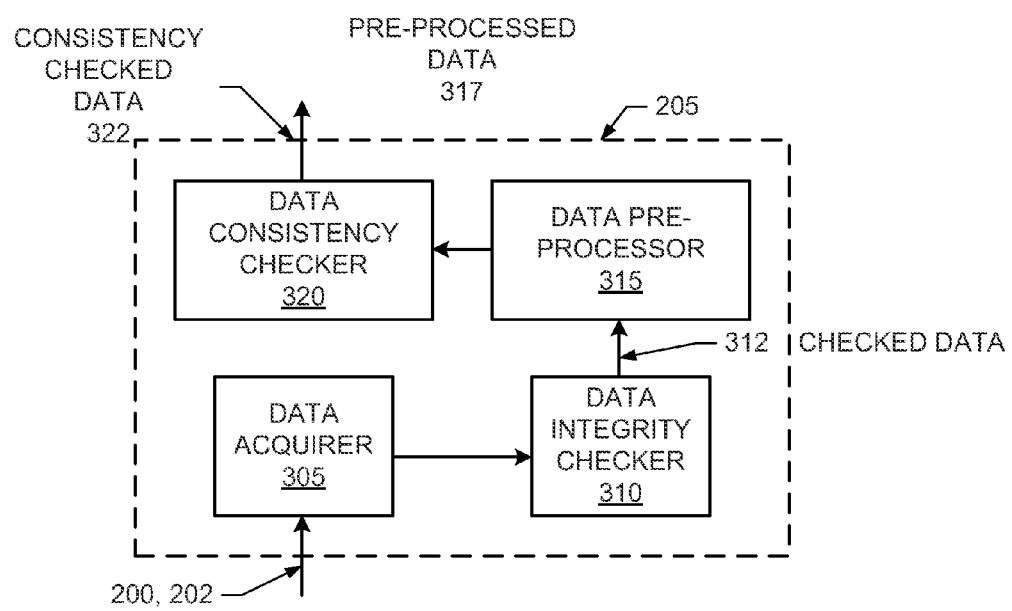
FIG. 3 illustrates an example manner of implementing the example data collector of FIG. 2.

FIG. 3 is a block diagram of the example data collector 205 of FIG. 2. To collect at least the first characteristic data 200 and the second characteristic data 202 from the example data source(s) 150, 155, 160, 170, the example data collector 205 of FIG. 3 includes a data acquirer 305. Using any of a variety of method(s), protocol(s), communication path(s), communication technology(ies), or any combination thereof, the example data acquirer 305 receives, collects or otherwise obtains data from the data source(s) 150, 155, 160, 170. The method(s) used by the example data acquirer 305 to obtain the data may differ from data source to data source.

To check the integrity of at least the first characteristic data 200 and the second characteristic data 202 acquired by the example data acquirer 305, the example data collector 205 of FIG. 3 includes a data integrity checker 310. The example data integrity checker 310 of FIG. 3 checks one or more of (a) if data is available, (b) if data falls in valid range(s), or (c) if data is timely (e.g., not too old). Which checks are performed by the example data integrity checker 310 may depend upon the type of data, the type of parameter(s) to be determined, user or technician preference(s), or a configuration of the example data collector 205. In the illustrated example, if the checks (e.g., conditions) are met (e.g., satisfied), then checked data 312 is passed to a data preprocessor 315. If the checks are not met, then the data integrity checker 310 discards the data or assigns the data a metric that represents the level of integrity of the data. If the data is discarded, then the data integrity checker 310 passes no data to the data preprocessor 315. If the data is not discarded by the example data integrity checker 310 but is instead assigned an integrity metric (e.g., INVALID_DATA), then the data integrity checker 310 passes the metric along with the checked data 312 to the data preprocessor 315. An example integrity metric is a variable having a value selected from OK, OLD_DATA and INVALID_DATA.

The example data pre-processor 315 of FIG. 3 processes the checked data 312 provided by the example data integrity checker 310 based upon the type of the data and in response produces pre-processed data 317. For example, the example data pre-processor 315 may scrub the checked data 312 to remove known invalid values such as the pilot tone in a bit allocation table, or to remove artifacts that may be irrelevant by applying, for example, filtering, smoothing, or noise reduction. An exemplary weighting method used for data "filtering" is described in United State Patent Application Publication Number 2006-0198430 corresponding to U.S. patent application Ser. No. 11/071,762 incorporated herein by reference.

To check the pre-processed data 317 for consistency, the example data collector 205 of FIG. 3 includes a data consistency checker 320. The example data consistency checker 320 of FIG. 3 evaluates the consistency of preprocessed data 317 received from the example preprocessor 315 using any of a variety of method(s), technique(s), logic or algorithm(s) to produce consistency checked data 322. For instance, the example data consistency checker 320 can (a) compare the pre-processed data 317 to previously collected pre-processed data 317 so that dramatically changed pre-processed data 317 can be flagged for the data combiner 215 (FIG. 2), (b) compare the pre-processed data 317 with a different set of pre-processed data 317 to see if they are mathematically consistent (e.g., signal-to-noise ratio data not matching bits per tone data), or (c) compare one portion of the pre-processed data 317 with another portion for unused or unexpected changes (e.g., an abrupt discontinuity, an unexpected discontinuity, change within the data or any combination thereof).

Which consistency checks are performed by the example data consistency checker 320 may depend upon the type of pre-processed data 317, the type of parameter(s) to be determined or a configuration of the example data collector 205. If the consistency checks (e.g., conditions) are met (e.g., satisfied), then the pre-processed data 317 satisfying the checks is stored in the data store(s) 210 (FIG. 2). If the checks are not met, then the example data consistency checker 320 discards the pre-processed data 317 failing the checks or assigns the pre-processed data 317 a metric that represents the level of consistency of the pre-processed data 317. If the pre-processed data 317 is discarded, then the example data consistency checker 320 does not store the pre-processed data 317 in the data store(s) 210. If the pre-processed data 317 is not discarded by the example data consistency checker 320, it may instead be assigned a consistency metric (e.g., INVALID_DATA). If the pre-processed data 317 is assigned a consistency metric, then the example data consistency checker 320 stores the consistency metric along with the pre-processed data 317 in the data store(s) 210. Example consistency metric is a variable having a value selected from OK, INCONSISTENT and INVALID_DATA.

Figure 4:
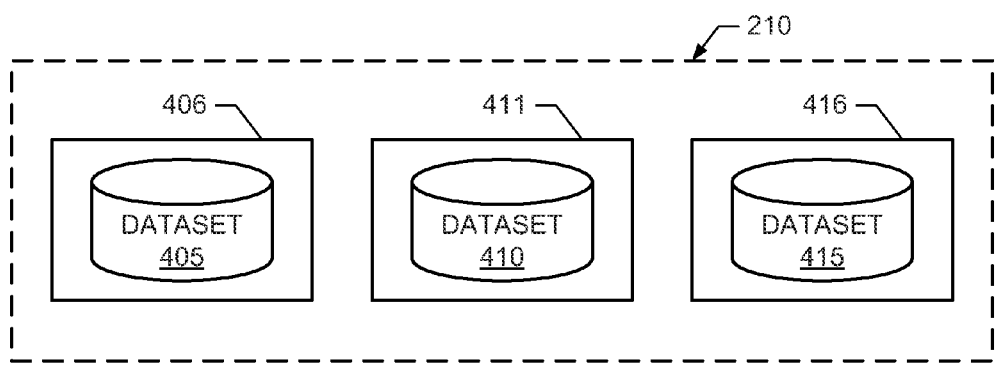
FIG. 4 illustrates an example manner of implementing the example data store(s) of FIG. 2.

FIG. 4 illustrates an example manner of implementing the example data store(s) 210 of FIG. 2. To store consistency checked data 322 that has been collected, checked or preprocessed by the example data checker 205, the example data store(s) 210 of FIG. 4 includes any number of datasets. Three example datasets 405, 410 and 415 are illustrated in FIG. 4. Consistency checked data 322 may be stored in the example datasets 405, 410, 415 using any of a variety of table(s), structure(s), array(s), indexing, organization or combination thereof. For example, consistency checked data 322 may be organized based on DSL subscriber identifier (e.g., name, address, etc.) or telephone line, based on data type, data source, etc. As illustrated in FIG. 4, the example datasets 405, 410, 415 are stored in respective machine accessible files or in any of a variety of memories 406, 411 and 416. Additionally or alternatively, the number of machine accessible files or memories may be different from the number of datasets.

Figure 5:
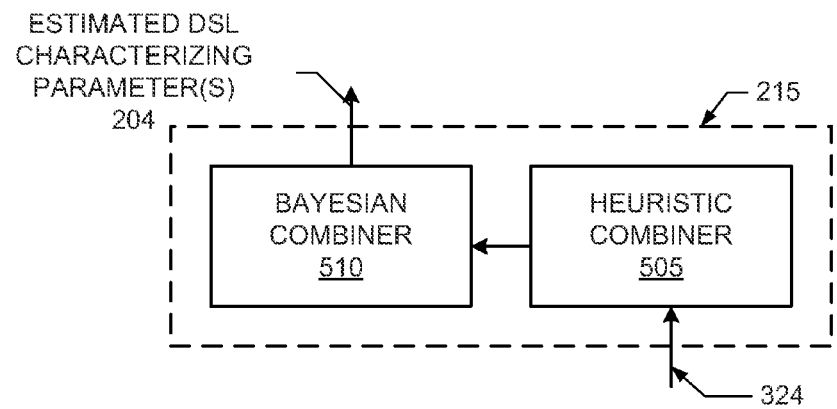
FIG. 5 illustrates an example manner of implementing the example data combiner of FIG. 2.

FIG. 5 illustrates an example manner of implementing the example data combiner 215 of FIG. 2. To logically or heuristically combine stored data 324 stored in the example data store(s) 210, the example data combiner 215 of FIG. 5 includes a heuristic combiner 505. The example heuristic combiner 505 applies heuristic or any combination of logical rules to exploit redundancies or structures known to exist amongst the various data sources 150, 155, 160, 170 (FIG. 1). For example, the heuristic combiner 505 may (a) compare first characteristic data 200 from a first source to second characteristic data 202 from a second source (e.g., compare bits per tone from the ACS 160 with bits per tone from the EMS 155), (b) use first characteristic data 200 from a first data source to fill in missing second characteristic data 202 for a second source (e.g., combine downstream bits per tone from the ACS 160 with upstream bits per tone from the EMS 155), or (c) if a first data source indicates a parameter with a high level of confidence (e.g., TDR data indicates the presence of a bridged tap with a very high likelihood) then second characteristic data 202 from a second source (e.g., a channel transfer function from the EMS 155) can be ignored or discarded.

To statistically or probabilistically combine data from more than one of the example data sources 150, 155, 160, 170 of FIG. 1, the example data combiner 215 of FIG. 5 includes a Bayesian combiner 510. The example Bayesian combiner 510 of FIG. 5 applies, for example, Bayes' theorem to infer parameter(s) of the example DSL system of FIG. 1 given more than one set of data and one or more conditional probabilities. The example Bayesian combiner 510 may also utilize any integrity or consistency metrics determined or provided by the example data collector 205 (FIG. 2). The one or more sets of data heuristically combined by the Bayesian combiner 510 may be associated with different or a same one of the example data source(s) 150, 155, 160, 170. Examples of data inferences that may be performed by the example Bayesian combiner 510 of FIG. 5 are discussed below in connection with FIGS. 6-12. An example implementation of the example Bayesian combiner 510 is discussed below in connection with FIGS. 14 and 15.

While an example data collector combiner 175 has been illustrated in FIG. 2, 3, 4 or 5, the elements, modules, logic, memory or devices illustrated in FIGS. 2-5 may be combined, re-arranged, re-partitioned, eliminated or implemented in any of a variety of ways. For example, any portion of the example data collector 205 of FIG. 2 may be implemented or performed by any of the example data sources 150, 155, 160, 170 of FIG. 1. Further, the example data collector 205, the example data stores 210, the example data combiner 215, the example data acquirer 305, the example data integrity checker 310, the example data preprocessor 315, the example data consistency checker 320, the example data set(s) 405, 410, 415, the example heuristic combiner 505, the example Bayesian combiner 510 or, more generally, the example data collector combiner 175 of FIGS. 1-5 may be implemented by hardware, software, firmware or any combination of hardware, software or firmware. For example, any or all of the example data collector 205, the example data stores 210, the example data combiner 215, the example data acquirer 305, the example data integrity checker 310, the example data preprocessor 315, the example data consistency checker 320, the example data set(s) 405, 410, 415, the example heuristic combiner 505, the example Bayesian combiner 510 or the example data collector combiner 175 may be implemented via machine accessible instructions executed by any of a variety of processors such as, for example, a digital signal processor (DSP), a general purpose processor or microcontroller, a specialized processor, a RISC processor, etc. Moreover, the data collector combiner 175 may include additional elements, modules, logic, memory or devices than those illustrated in FIG. 2-5 or may include more than one of any or all of the illustrated elements, modules or devices.

A Bayesian network is a graphical representation or tool useful for characterizing relationships amongst a set of discrete random variables. A Bayesian network consists of a directed acyclic graph and a set of conditional probability relationships. The edges of the graph of a Bayesian network have a direction that represents a dependency relationship (e.g., causative relationship), where parents of a given node are all those nodes with edges pointed into the given node. In a Bayesian network, each node of the graph is associated with a conditional probability mass function of the node, given its parents, that is, P(node|parents) where P( ) represents probability. Among other things, a Bayesian network together with Bayes' theorem are useful in deriving or developing one or more statistical or probabilistic mathematical expressions that determine, estimate, compute or infer a parameter associated with a node given one or more parent or child nodes and the conditional probabilities of the nodes (i.e., making a Bayesian inference).

In general, computing a Bayesian inference (i.e., computing the exact maximum à posteriori (MAP) probabilities for a Bayesian network) is computationally intensive. However, a Bayesian network may be constructed with a few nodes and small cardinality for each of the random variables. The class of so called "polytrees", namely, the class of Bayesian networks whereby the underlying undirected graph has no loops, has an inference algorithm (Pearl's "belief propagation" algorithm) based on "intrinsic-extrinsic" message passing.

Figure 6:
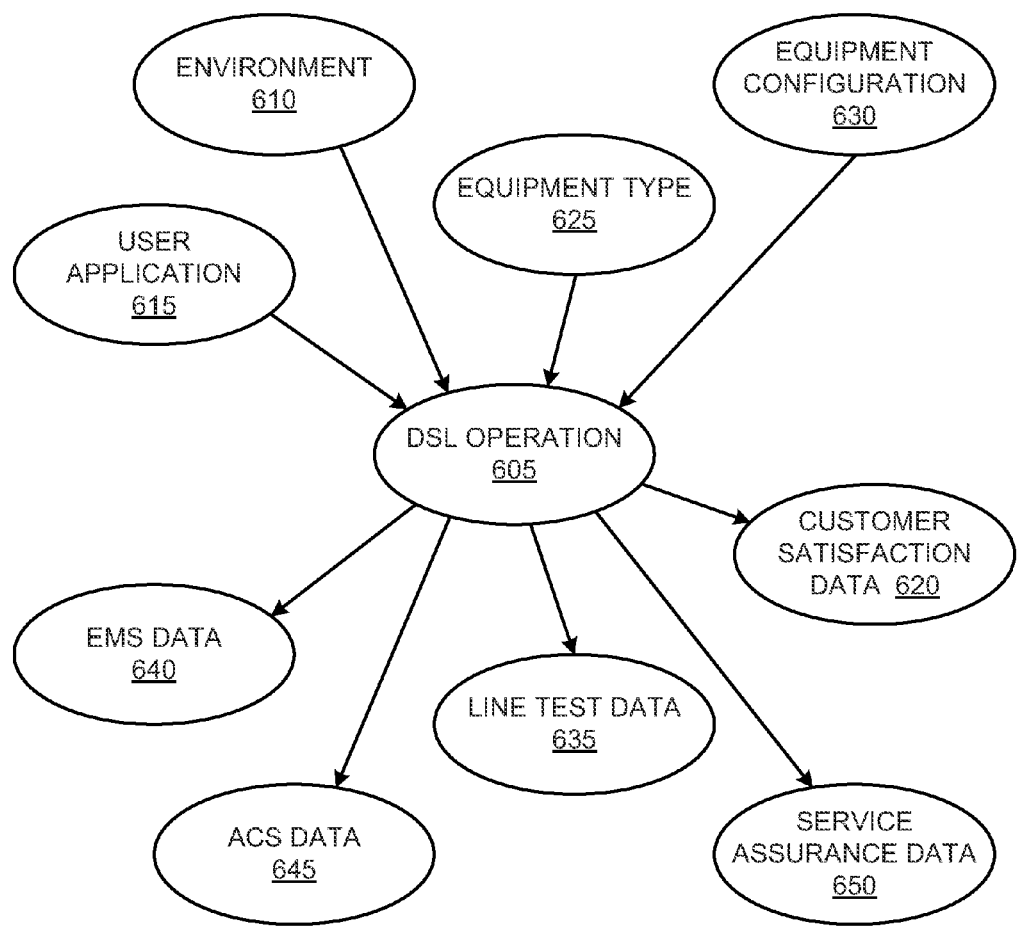
FIG. 6 illustrates an example Bayesian network corresponding to the example DSL communication system of FIG. 1.

FIG. 6 is an example Bayesian network associated with operation aspects 605 of a subscriber's DSL service for the example DSL system of FIG. 1. Example DSL operation variables 605 include current margin, current bit rate, current bit distribution, current transmitted PSD, history of DSL errors, channel transfer function, echo transfer function, noise characteristics, or any suitable data. The example DSL operation variables 605 of FIG. 6 are associated with the example EMS 155 or the example ACS 160 (FIG. 1). The operation variables 605 may correspond with one or more DSL characteristics, such as the first characteristic data 200 and the second characteristic data 202. An example process that may be performed or executed to construct a Bayesian network for a communication system (e.g., the example DSL system of FIG. 1) is discussed below in connection with FIG. 16.

To represent variables associated with the physical environment in which the DSL service 605 operates, the example Bayesian network of FIG. 6 includes an environment node 610. The example environment variables 610 of FIG. 6 are associated with the example line tester 150 or the example ACS 160 or the example EMS 155 (see FIG. 1). Example environment variables 610 include telephone line or loop makeup (e.g., length, bridged tap location/length, bad splice, microfilter, etc.) and noise (e.g., near-end crosstalk, far-end crosstalk, background noise, impulse noise, amplitude modulation (AM) noise, etc.).

To represent applications or application types used by a DSL subscriber, the example Bayesian network of FIG. 6 includes a user application node 615. The example application variables 615 of FIG. 6 are associated with the example SAS 170 (see FIG. 1). Example user application types 615 include web-browsing, email, IPTV, VoIP, messaging, audio, video, chat, etc. As illustrated in FIG. 6, application types 615 have an effect on the DSL operation 605, which then effects a customer satisfaction 620.

To represent equipment type information, the example Bayesian network of FIG. 6 includes an equipment type node 625. The example equipment type information 625 of FIG. 6 is associated with the example EMS 155 or the example ACS 160 (see FIG. 1). Example equipment type information 625 includes chipset type, modem or system type, hardware version, firmware version, modem bug information, vendor identification, etc.

To represent equipment configuration information, the example Bayesian network of FIG. 6 includes an equipment configuration node 630. The example equipment configuration information 630 of FIG. 6 is associated with the example EMS 155 or the example ACS 160 (see FIG. 1). Example equipment configuration information 630 includes minimum supported data rate, maximum supported data rate, minimum margin, target margin, maximum margin, delay, minimum impulse noise protection, power spectral density (PSD) mask, carrier mask, etc. The example equipment configuration 630 variables may be inaccessible, unchangeable or hard-coded, or may be controllable via, for example, the EMS 155 (see FIG. 1).

To represent line test or diagnostic data, the example Bayesian network of FIG. 6 includes a line test data node 635. The example line test data 635 of FIG. 6 is associated with the example line tester 150 or the example ACS 160 (see FIG. 1). Example line test data 635 includes Line test data, Time-Domain-Reflectometry (TDR) data, Frequency-Domain-Reflectometry (FDR) data, Single-Ended-Loop-Testing (SELT) data, Double-Ended-Loop-Testing (DELT) data, impedance, channel attenuation, loop resistance, loop capacitance, loop inductance, noise on the loop or any other suitable data.

To represent customer satisfaction data, the example Bayesian network of FIG. 6 includes the customer satisfaction node 620. The example customer satisfaction data 620 of FIG. 6 is associated with the example SAS 170 (see FIG. 1). Example customer satisfaction data 620 include number of recent service calls, number of required truck rolls, customer survey response, customer ratings, etc.

To represent parameters of ongoing or past DSL operation, the example Bayesian network of FIG. 6 includes an EMS parameters node 640 and an ACS parameters node 645. The example EMS parameters 640 and ACS parameters 645 of FIG. 6 are associated with the example EMS 155 and ACS 160 (see FIG. 1), respectively. Example EMS parameters 640 and ACS parameters 645 include bit allocations, SNRs, channel transfer functions, channel attenuation, counts of code violations, counts of errored seconds, delay, impulse noise protection, Double-Ended-loop-Testing (DELT) data, or any other suitable parameters.

To represent service assurance data, the example Bayesian network of FIG. 6 includes a service assurance node 650. The example service assurance data 650 of FIG. 6 is associated with the example SAS 170 (see FIG. 1). Example service assurance data 650 include MPEG statistics (e.g., a number of lost frames), packet loss rate, lost packets, out-of-order packets, delayed packets, corrupted packets, buffer overflow/underflow events, TCP statistics, UDP statistics, packet jitter data or any suitable data. Performance information that may be used to characterize service quality may include: packet loss rate, network statistics, network congestion, customer satisfaction data or any suitable data.

While an example Bayesian network has been illustrated in FIG. 6, the nodes or edges may be combined, re-arranged, eliminated or implemented in any of a variety of ways. Further, the example Bayesian network of FIG. 6 may be extended to include more than one telephone line or DSL service. Further still, a Bayesian network may include additional nodes or edges than those illustrated in FIG. 6 or may include more than one of any or all of the illustrated nodes or edges. Moreover, while particular example associations of data and nodes were described above and shown in FIG. 6, alternative associations may be utilized.

Persons of ordinary skill in the art will readily appreciate that there are a number of uncertainties that may affect the data, parameters, information or variables represented by the example Bayesian network of FIG. 6. Example uncertainties in the DSL operation 605 include (a) models for relationships between nodes do not always capture real-world effects, (b) various types of equipment have different behaviors or characteristics, (c) some equipment uses proprietary modifications or enhancements, (d) unknown or unmodeled environmental parameters or effects, or (e) errors in equipment configuration. Example uncertainties that affect observations include (a) measurement errors, (b) lack of data, (c) measurements do not conform to standards, (d) old data, or (e) implementation variations.

The example Bayesian network of FIG. 6 can be used to make a variety of inferences. For example, (a) a diagnostic inference (e.g., using EMS data 640 or ACS data 645 to infer loop parameters 610), (b) a causal inference (e.g., evaluating an effect of changing configuration setting 630 on customer satisfaction 620), (c) an intercausal inference (e.g., using EMS data 640 or ACS data 645 and knowledge of the loop 610 to estimate a noise 610 or (d) a mixed inference combining one or more of above examples.

According to one embodiment, substantially all reported, computed, measured or estimated parameter(s) or signal(s) in a DSL system or network may be discrete (e.g., due to quantization), and the example data collector combiner 175 of FIGS. 1-5 may consider or represent one or more variables as continuous variables. For example, QLN might be represented as a continuous variable having a range of 0 decibel milliwatts per Hertz (dBmW)/Hz to −150 dBmW/Hz.

Further, while the example Bayesian network of FIG. 6 represents each telephone line or DSL service separately, it is possible to expand or enhance the example Bayesian network to encompass inter-relationships amongst telephone lines or to apply relationships learned or developed for one telephone line in a binder to a second telephone line in the same or a different binder. Such extensions can be used to, for example, better characterize or combat crosstalk or impulse noise interference.

Many of the dependencies illustrated in the example Bayesian network of FIG. 6 can be modeled or computed theoretically. Additionally or alternatively, simulated or computation models may be used to refine, simplify, or serve as a reference point for inference(s) made using the illustrated example of FIG. 6.

Figure 7:
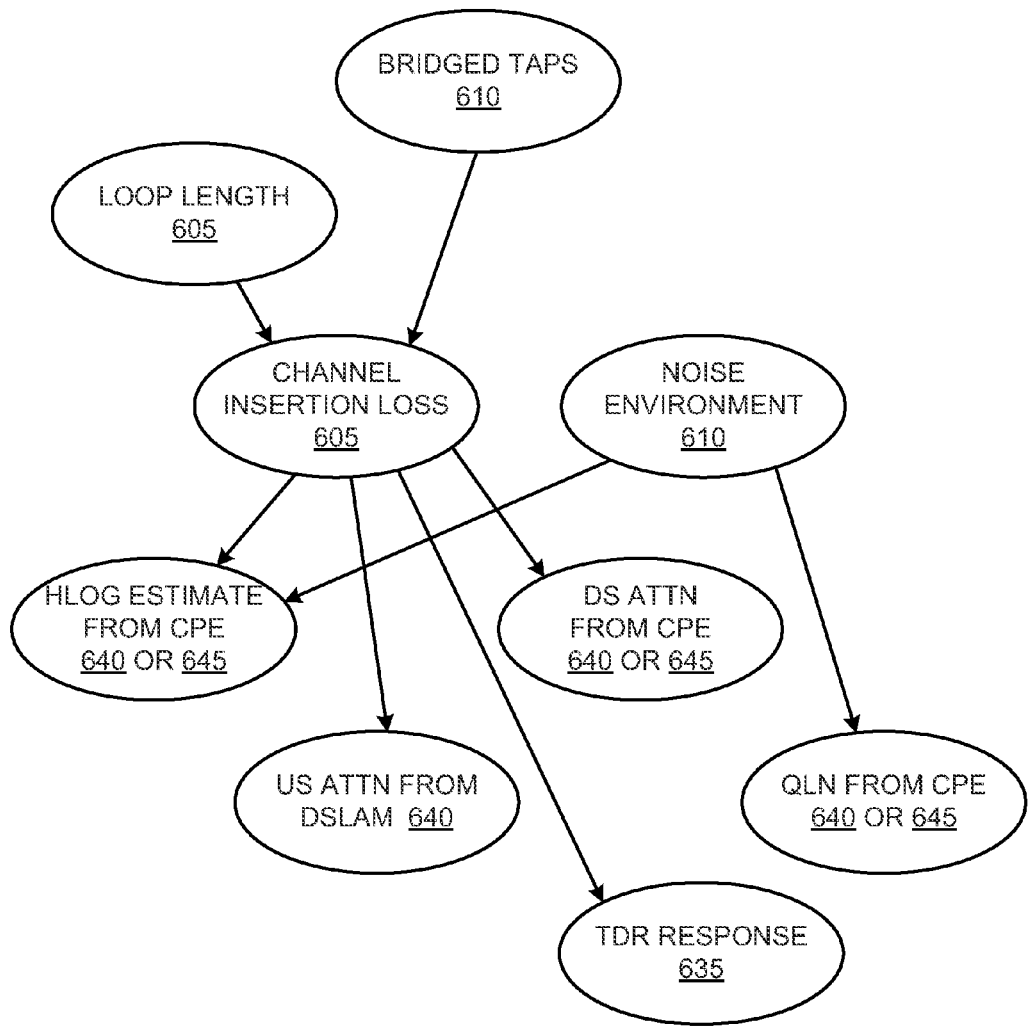
FIGS. 7-12 illustrate example Bayesian networks that represent example characteristics of the example DSL communication system of FIG. 1.

FIGS. 7-12 illustrate example Bayesian networks within the example Bayesian network of FIG. 6 that represent example spectrum management scenarios of interest. The example Bayesian networks of FIGS. 7-12 belong to the example Bayesian network of FIG. 6 and, thus, for ease of understanding references numerals shown in FIGS. 7-12 indicate to which of the example node(s) of FIG. 6 particular data, variables or information belong. For example, an example loop length 610 illustrated in FIG. 7 is a part of the example environment variables node 610 of FIG. 6. While example scenarios or example Bayesian networks of interest are illustrated in FIGS. 7-12, other examples for use in maintaining, monitoring, troubleshooting, diagnosing, offering, selling or provisioning of DSL services will be readily apparent to persons of ordinary skill in the art.

FIG. 7 illustrates an example Bayesian network for detecting a presence of a bridged tap based on data from two or more of the example data sources 150, 155, 160, 170 (FIG. 1). As illustrated in FIG. 7 a bridged tap affects one or more of a channel response (HLOG) 640/645, an upstream attenuation 640, a TDR response 635, or a downstream attenuation 640/645. For some DSL modems, the channel response 640/645 is affected by a noise environment 610 that can be inferred from a QLN 640/645 as reflected in the example Bayesian network of FIG. 7. Since the example Bayesian network of FIG. 7 is a polytree, a version of, for example, the Pearl algorithm may be executed or implemented to infer (i.e., detect) the presence of the bridged tap 610.

Figure 8:
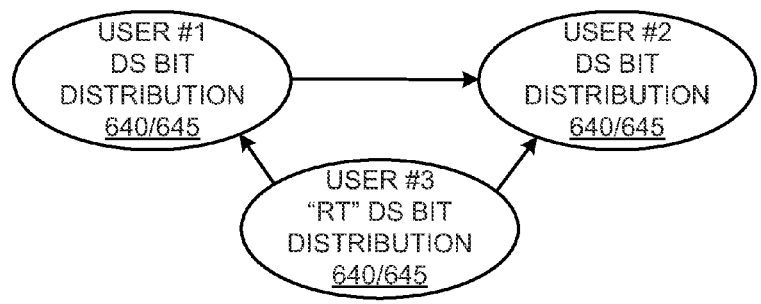

FIG. 8 illustrates an example Bayesian network for modeling the effect of bit allocation of one DSL modem onto another DSL modem. The example Bayesian network of FIG. 8 may also be used to represent the impact due to a DSL modem manufacturer not using an exact (e.g., Levin-Campello) water filling algorithm. In particular, the example Bayesian network of FIG. 8 models a DSL system having three (3) DSL modems respectively corresponding to user #1, user #2 and user #3. In the example of FIG. 8, the downstream (DS) bit distribution for user #3 dominates interference into the telephone lines serving user #1 and user #2. For example, when user #3 is served by a DSLAM located in a remote terminal (RT) it may cause significant crosstalk for user #1 and user #2, which are served by a DSLAM located in a CO. In contrast to the example of FIG. 7, the example Bayesian network of FIG. 8 is not a polytree and, thus, a version of the Pearl algorithm is not applicable to perform inferences for the illustrated example. Instead, any of a variety of iterative approximations to the Pearl algorithms may be employed to perform such inferences.

Figure 9:
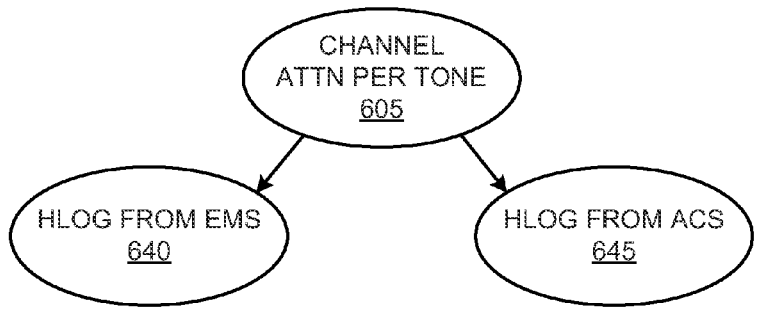

FIG. 9 illustrates an example Bayesian network to estimate (i.e., infer) a channel attenuation based on HLOG values from the example EMS 155 and the example ACS 160 of FIG. 1. Assuming that the HLOG values from the EMS 155 ($HLOG_{EMS}$ values 640) and HLOG values from the ACS 160 ($HLOG_{ACS}$ values 645) are corrupted by additive Gaussian noise with zero mean, and that the noises are independent, then $HLOG_{EMS}$ 640 and $HLOG_{ACS}$ 645 can be expressed using the following mathematical expressions:

$$HLOG_{EMS} = HLOG + n_1,$$

$$HLOG_{ACS} = HLOG + n_2 \quad \text{EQN (1)}$$

Where $n_1$ and $n_2$ represent the additive noise, and HLOG represents the actual HLOG values 605 to be inferred. The probability distribution of HLOG 605 can be expressed mathematically as illustrated in the following equation:

$$P(HLOG \mid HLOG_{EMS}, HLOG_{ACS}) = \frac{P(n_1)P(n_2)P(HLOG)}{P(HLOG_{EMS}, HLOG_{ACS})}, = cP(n_1)P(n_2)(HLOG) \quad \text{EQN (2)}$$

where c is a constant. Assuming a uniform distribution for HLOG 605, the maximum-likelihood (ML) estimate of HLOG 605 given the reported $HLOG_{EMS}$ values 640 and $HLOG_{ACS}$ values 645 can be found by maximizing the conditional probability illustrated in EQN (2), or equivalently the logarithm of the conditional probability:

$$\max_{HLOG} \ln[P(n_1)P(n_e)] = \min_{HLOG} \left[ \begin{array}{l} \ln(2\pi) + \ln(\sigma_1\sigma_2) + \\ \dfrac{\left(\dfrac{HLOG_{EMS} - }{HLOG}\right)^2}{2\sigma_1^2} + \\ \dfrac{\left(\dfrac{HLOG_{ACS} - }{HLOG}\right)^2}{2\sigma_2^2} \end{array} \right], \quad \text{EQN (3)}$$

where $\sigma_1$ is the variance of noise $n_1$ and $\sigma_2$ is the variance of noise $n_2$. It can be readily derived from the mathematical expression of EQN (3) that the ML estimate of HLOG 605 is a weighted sum of the reported $HLOG_{EMS}$ values 640 and $HLOG_{ACS}$ values 645, where the weight depends upon the relative value of the noise variances $\sigma_1$ and $\sigma_2$.

Figure 10:
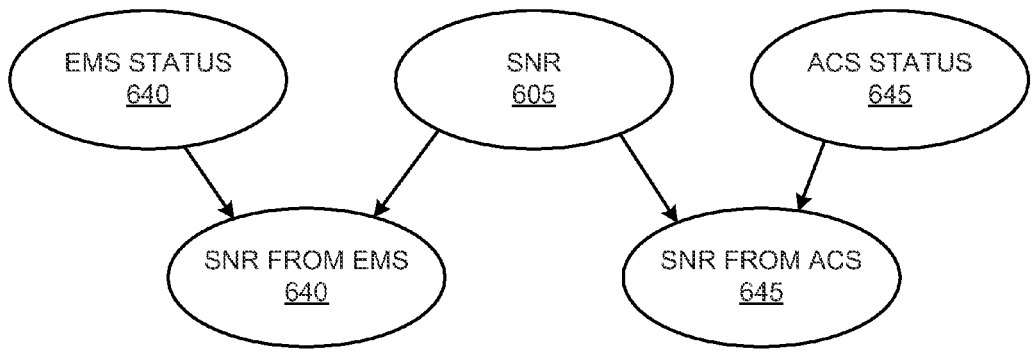

FIG. 10 illustrates an example Bayesian network to estimate an SNR 605 based on SNR values 640 and 645 from the example EMS 155 and the example ACS 160 of FIG. 1. The example Bayesian network of FIG. 10 is similar to the example network of FIG. 9. However, the example network of FIG. 10 has been enhanced to reflect status information 640 about the $SNR_{EMS}$ 640 values and status information 645 about the $SNR_{ACS}$ 645 values. Example status information 640, 645 may be consistency or integrity metrics determined by, for example, the example data collector 205 of FIG. 2. In the example Bayesian network of FIG. 10, each of the status information 640 and 645 are discrete variables having a value selected from the set {OK, OLD_DATA, INVALID_DATA} having corresponding probabilities {80%, 10%, 10%}.

Like the example discussed above in connection with FIG. 9, $SNR_{EMS}$ 640 values and the $SNR_{ACS}$ 645 values can be modeled as SNR 605 plus a Gaussian zero-mean noise. However, in contrast to the example of FIG. 9, the variance of the added noise depends upon the status information 640 and 645, respectively. For example, (a) if EMS status 640 is OK a noise $n_1$ is assumed to have been added to $SNR_{EMS}$ 640, (b) if EMS status 640 is OLD_DATA a noise $n_3$ is assumed to have been added to $SNR_{EMS}$ 640, (c) if ACS status 645 is OK a noise $n_2$ is assumed to have been added to $SNR_{ACS}$ 645, and (d) if ACS status 645 is OLD_DATA a noise $n_4$ is assumed to have been added to $SNR_{ACS}$ 645. If the $SNR_{EMS}$ 640 values (or the $SNR_{ACS}$ 645 values) have status of INVALID_DATA, then $SNR_{EMS}$ 640 is modeled as a noise $R_1$ ($R_2$) having a uniform distribution, that is, $SNR_{EMS} = R_1$ ($SNR_{ACS} = R_2$). The probability distribution of SNR 605 can be expressed mathematically as illustrated in the following equation:

$$P(SNR \mid SNR_{EMS}, SNR_{ACS}) = cP(SNR_{EMS} \mid SNR) P(SNR_{ACS} \mid SNR) P(SNR). \quad \text{EQN (4)}$$

where c is a constant and the conditional probabilities can be expressed as $$P(SNR_{EMS} \mid SNR) = \Sigma P(SNR_{EMS} \mid SNR, EMS\_status) P(EMS\_status), \text{ and} \quad \text{EQN (5)}$$

$$P(SNR_{ACS} \mid SNR) = \Sigma P(SNR_{ACS} \mid SNR, ACS\_status) P(ACS\_status). \quad \text{EQN (6)}$$

The ML estimate of SNR 605 can be found by maximizing the following mathematical expression with respect to SNR 605:

$$P(SNR_{EMS} \mid SNR)P(SNR_{ACS} \mid SNR) = [0.8P(n_1) + 0.1P(n_3) + 0.1P(R_1 = SNR_{EMS})][0.8P(n_2) + 0.1P(n_4) + 0.1P(R_2 = SNR_{ACS})] \quad \text{EQN (7)}$$

Figure 11:
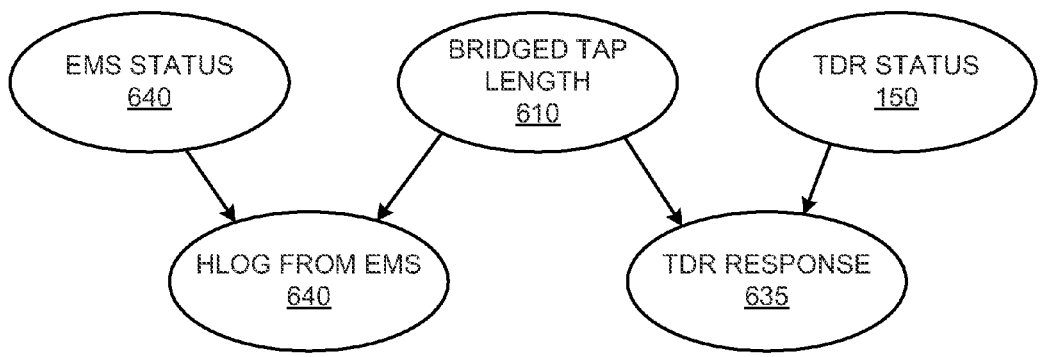

FIG. 11 illustrates an example Bayesian network for inferring a bridged tap length 610 given dissimilar types of data $HLOG_{EMS}$ 640 and TDR response 635. The bridged tap length 610 can be inferred similarly to that discussed above in connection with FIG. 10. In particular, assuming that the loop length and gauge are available or obtained, a theoretical $HLOG_{THE}$ and a theoretical $TDR_{THE}$ response can be computed given a particular bridged tap length 610. The computed $HLOG_{THE}$ and $TDR_{THE}$ are then used similarly to that shown above in EQN (1). The solution discussed above in connection with the example of FIG. 10 can then be used to compute the solution (i.e., infer the bridged tap length 610).

Figure 12:
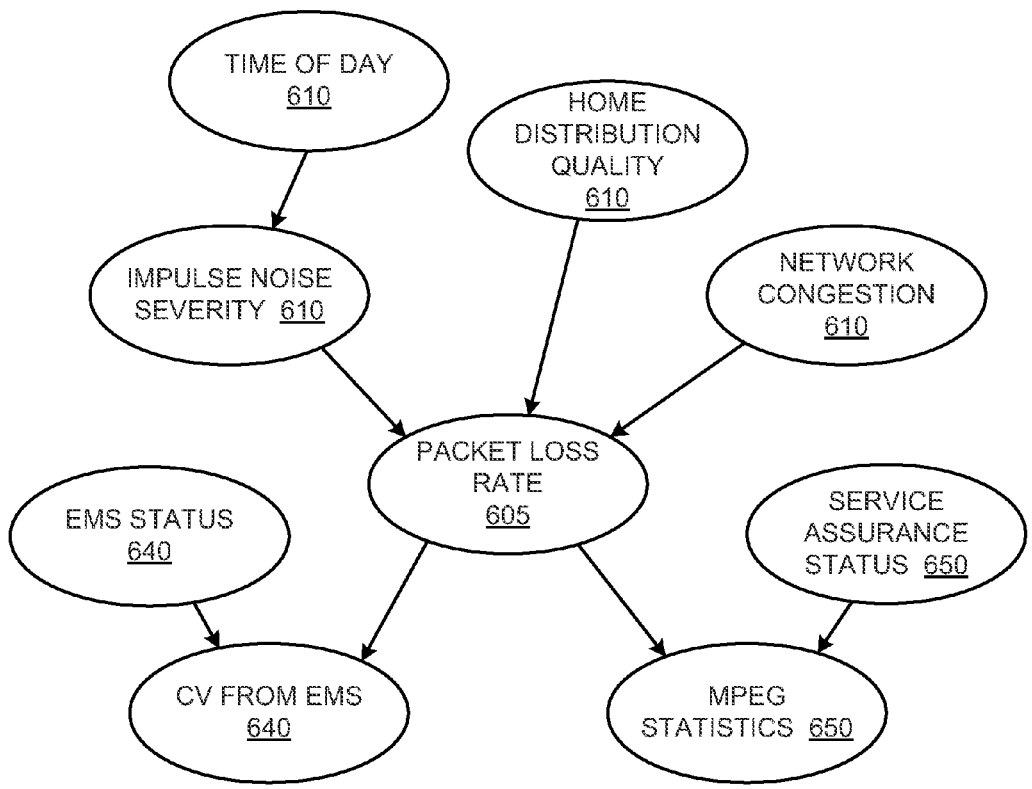

FIG. 12 illustrates an example Bayesian network illustrating a more complex reasoning system to estimate a packet loss rate 605. The packet loss rate 605 of FIG. 12 is indirectly observed through a code violation (CV) count 640 and lost MPEG frames count 650. The CV count 640 depends upon a status 640 of the example EMS 155. As illustrated, the packet loss rate 605 is mainly affected by the factors of impulse noise severity 610, physical layer problems related to the in-home signal distribution 610 and network congestion 610.

The example Bayesian network of FIG. 12 may be used to estimate a distribution for packet loss rate 605 given knowledge of the CV count 640, the MPEG statistics 650 and a time of day 610. While a DSL network may not collect the CV count 640 often enough to estimate the packet loss rate accurately at 605, the illustrated example Bayesian network can be used to derive a distribution of the packet loss rate 605 and, thus, subsequently determine a "worst-case" value with a certain level of confidence.

The conditional probability for packet loss rate (PLR) 605 can be expressed in the following mathematical expression:

$$P(PLR|CV,MPEG,Time) = cP(CV|PLR)P(MPEG|PLR)P(PLR|Time), \quad \text{EQN (8)}$$

where c is a constant. The conditional probability for CV 640 given the PLR 605, P(CV|PLR), can be computed based on experimental results or by performing a basic analysis to determine the relationship between errors within discrete multi-tone (DMT) superframes and errors within Ethernet packets. The conditional probability for lost MPEG frames 650 given the PLR 605, P(MPEG|PLR), can be computed with experimental results or by performing a basic analysis to determine the relationship between errors within an Ethernet packet and corrupted or lost MPEG frames 650. The computations to determine the conditional probabilities depend upon the EMS status 640 and the SAS status 650.

The right most term of EQN (8), P(PLR|Time) can be computing using the following mathematical expression:

$$P(PLR \mid Time) = \sum_{imp}\sum_{Home}\sum_{cong} P(PLR \mid imp, Home, cong) P(imp \mid Time) P(Home) P(cong) \quad \text{EQN (9)}$$

Where imp is the impulse noise severity 610, Home is physical layer problems related to the in-home signal distribution 610 and cong is network congestion 610. Each of the terms of EQN (9) can be evaluated based on experimental results or on analysis. To reduce the complexity or number of computations necessary to solve the solution expressed mathematically by EQN (8) and EQN (9), the PLR 605 can be modeled as a discrete variable having 3 possible values of high, medium or low.

Figure 13:
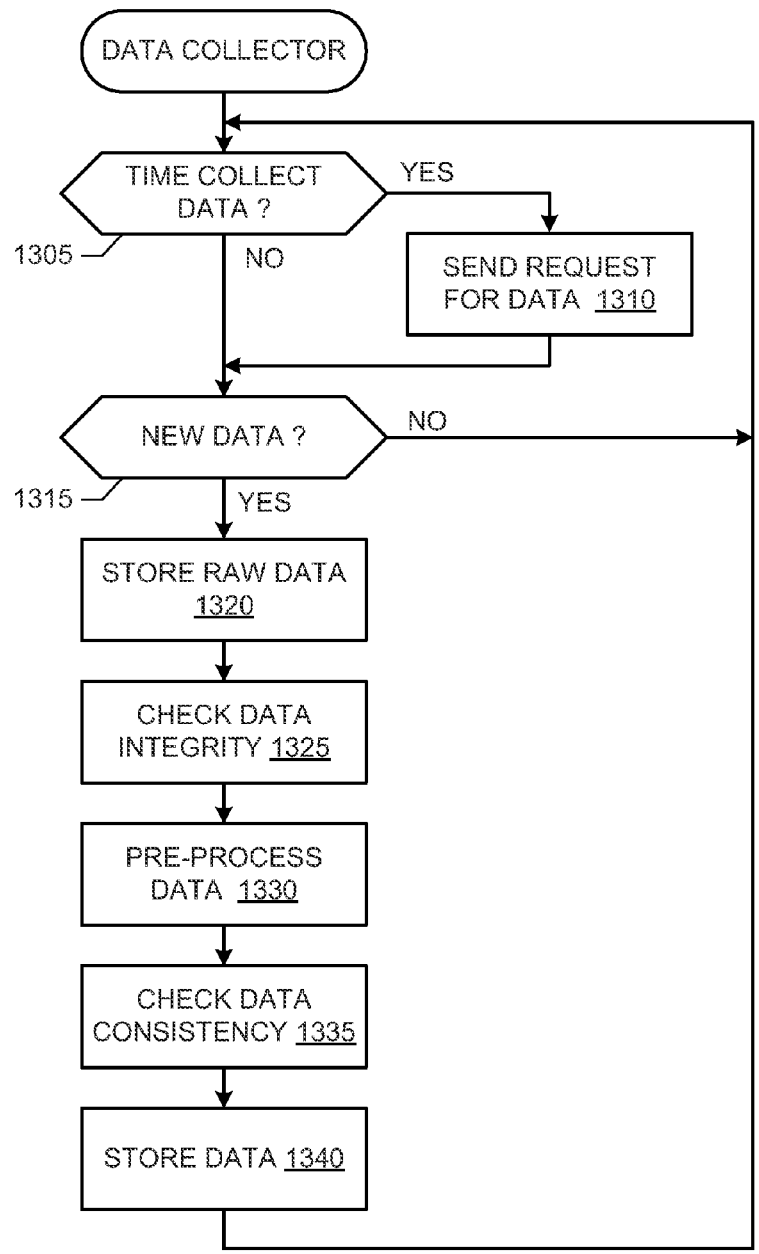
FIG. 13 is a flowchart representative of example machine accessible instructions that may be executed to implement the example data collector of FIG. 2 or 3.
Figure 14:
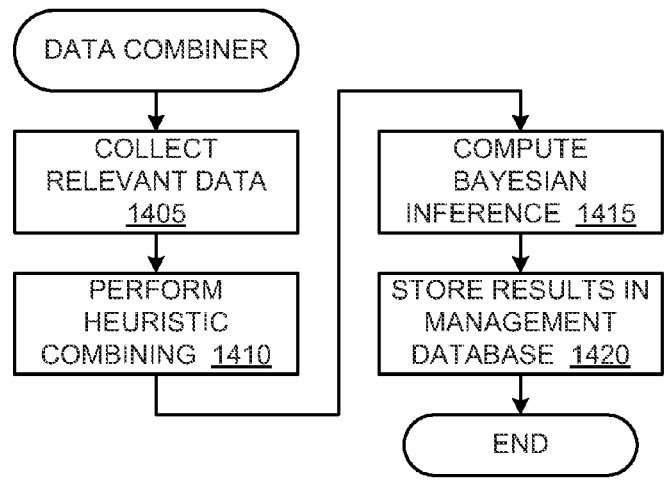
FIG. 14 is a flowchart representative of example machine accessible instructions that may be executed to implement the example data combiner of FIG. 2 or 5.

FIGS. 13 and 14 are flowcharts representative methods to implement the example data collector 205, the example data combiner 215, or more generally the example data collector combiner 175. According to one embodiment, FIGS. 13 and 14 are flowcharts representative of example machine accessible instructions. The example machine accessible instructions of FIG. 13 or 14 may be executed by a DSP, processor, a core, a controller or any other suitable processing device. For example, the example machine accessible instructions of FIG. 13 or 14 may be embodied in coded instructions stored on a tangible medium such as a flash memory, or RAM associated with a processor (e.g., the processor 1510 shown in the example processor platform 1500 and discussed below in conjunction with FIG. 15). Alternatively, some or all of the example flowcharts of FIG. 13 or 14 may be implemented using an application specific integrated circuit (ASIC), a programmable logic device (PLD), a field programmable logic device (FPLD), discrete logic, hardware, firmware, etc. Also, some or all of the example flowcharts of FIG. 13 or 14 may be implemented manually or as combination(s) of any of the foregoing techniques, for example, a combination of firmware, software or hardware. Further, although the example machine accessible instructions of FIGS. 13 and 14 are described with reference to the flowcharts of FIGS. 13 and 14, persons of ordinary skill in the art will readily appreciate that many other methods of implementing the example data collector 205, the example data combiner 215, or more generally the example data collector combiner 175 may be employed. For example, the order of execution of the blocks may be changed, or some of the blocks described may be changed, eliminated, sub-divided, or combined. Additionally, persons of ordinary skill in the art will appreciate that the example machine accessible instructions of FIG. 13 or 14 may be carried out sequentially or carried out in parallel by, for example, separate processing threads, processors, devices, circuits, etc. Moreover, the machine accessible instructions of FIG. 13 or 14 may be carried out, for example, serially or in parallel with any other variety of machine accessible instructions, processes or operations.

The example machine accessible instructions of FIG. 13 begin with a data collector (e.g., the example data collector 205 of FIG. 2 or 3) checking if a time to collect data has arrived (block 1305). If a time to collect data has arrived (block 1305), the data collector may request that one or more of the example data source(s) 150, 155, 160, 170 collect or provide the corresponding data (block 1310) including at least first characteristic data 200 and second characteristic data 202. Alternatively, the example data source(s) 150, 155, 160, 170 may periodically or a periodically obtain or collect data such that the data collector at block 1310 simply obtains the collected data from the data source(s) 150, 155, 160, 170 where the data is forwarded on by polling the source(s) 150, 155, 160, 170. Control then proceeds to block 1315.

Returning to block 1305, if a time to collect data has not arrived (block 1305), the data collector determines if new data has been obtained or is being provided to or received by the data collector (block 1315). Data may be obtained by, provided to or received by the data collector in response to a request sent at block 1310 or in response to a request received by the example data collector combiner 175 of FIG. 1 or 2 to infer a data, parameter or variable. If data has not been obtained, provided to or received by the data collector (block 1315), control returns to block 1305.

If data has been obtained, provided to or received by the data collector (block 1315), the data collector stores or saves the raw (e.g., original) data (block 1320). As discussed above in connection with FIG. 3, the data collector checks the integrity of the data (block 1325), preprocesses the data (block 1330), checks the consistency of the data (block 1335) and stores the processed data in the data store(s) 210 of FIG. 2 (block 1340). Control then returns to block 1305.

The example machine accessible instructions of FIG. 14 begin with a data combiner (e.g., the example data combiner 215 of FIG. 2 or 5) collecting relevant data from, for example, the example data store(s) 210 of FIG. 2 (block 1405). For the example of FIG. 9, the data combiner would collect HLO-$G_{EMS}$ 640 and $HLOG_{ACS}$ 645 at block 1405. As described above in connection with FIG. 5, the data combiner performs heuristic or any combination of logical combining of the collected data (block 1410).

The data combiner then computes a requested parameter using Bayesian Inference (block 1415). For the example of FIG. 9, the data combiner computes a weighted sum of HLO- $G_{EMS}$ 640 and $HLOG_{ACS}$ 645 at block 1415. At block 1415, the data combiner may perform one or more Bayesian inference(s) based on any of the Bayesian networks discussed above in connection with FIGS. 6-12 or any other Bayesian network. Indeed, the data combiner of the illustrated example may perform or infer parameters using any Bayesian network that describes relationships amongst parameters for the example DSL system of FIG. 1. The parameter(s) determined by the data combiner (block 1415) are then stored in the example database 180 for use by or via the example NMS 190 of FIG. 1.

Figure 15:
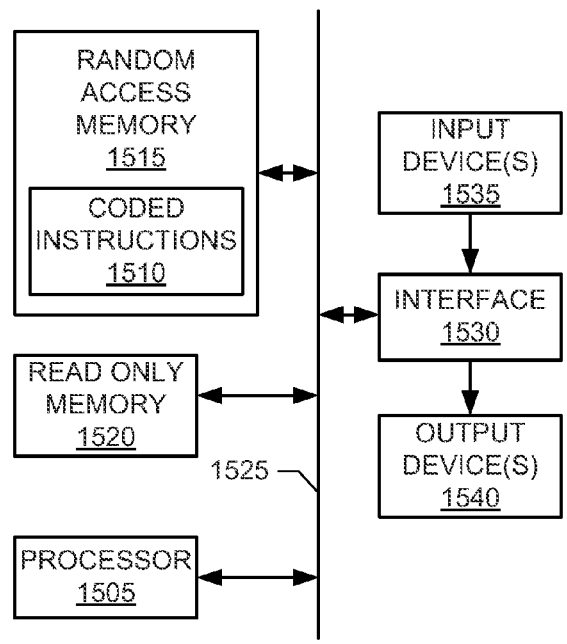
FIG. 15 is a schematic illustration of an example processor platform that may be used or programmed to implement the example machine accessible instructions illustrated in FIG. 13 or 14 to implement the example data collector, the example data combiner, the example data collector combiner, or any combination thereof.

FIG. 15 is a schematic diagram of an example processor platform 1500 that may be used or programmed to implement the example data collector 205, the example data combiner 215 of FIG. 1-3 or 5 or the example Bayesian networks of FIGS. 6-12. For example, the processor platform 1500 can be implemented by one or more general purpose processors, cores, microcontrollers, etc.

The processor platform 1500 of the example of FIG. 15 includes a programmable processor 1505. The processor 1505 executes coded instructions 1510 present in main memory of the processor 1505 (e.g., within a random access memory (RAM) 1515). The processor 1505 may be any type of processing unit, such as a DSP, a RISC processor, a general purpose processor, a customized processor from the INTEL®, AMD®, SUN®, IBM® families of cores, processors, a microcontrollers or any combination thereof. The processor 1505 may execute, among other things, the example machine accessible instructions of FIG. 13 or 14 to implement the example data collector 205, the example data combiner 215 of FIG. 1-3 or 5, or the example Bayesian networks of FIGS. 6-12.

The processor 1505 is in communication with the main memory (including a read only memory (ROM) 1520 and the RAM 1515) via a bus 1525. The RAM 1515 may be implemented by dynamic random access memory (DRAM), Synchronous DRAM (SDRAM), or any other type of RAM device, and ROM may be implemented by flash memory or any other desired type of memory device. Access to the memory 1515 and 1520 is typically controlled by a memory controller (not shown). The RAM 1515 may be used to store, for example, the example datasets 405, 410, 415 of FIG. 4 or more generally to implement the example data store(s) 210 of FIG. 2.

The processor platform 1500 also includes an interface circuit 1530. The interface circuit 1530 may be implemented by any type of interface standard, such as an external memory interface, serial port, general purpose input/output, etc.

One or more input devices 1535 and one or more output devices 1540 are connected to the interface circuit 1530. The output devices 1540 may be used, for example, to display or provide a GUI.

Figure 16:
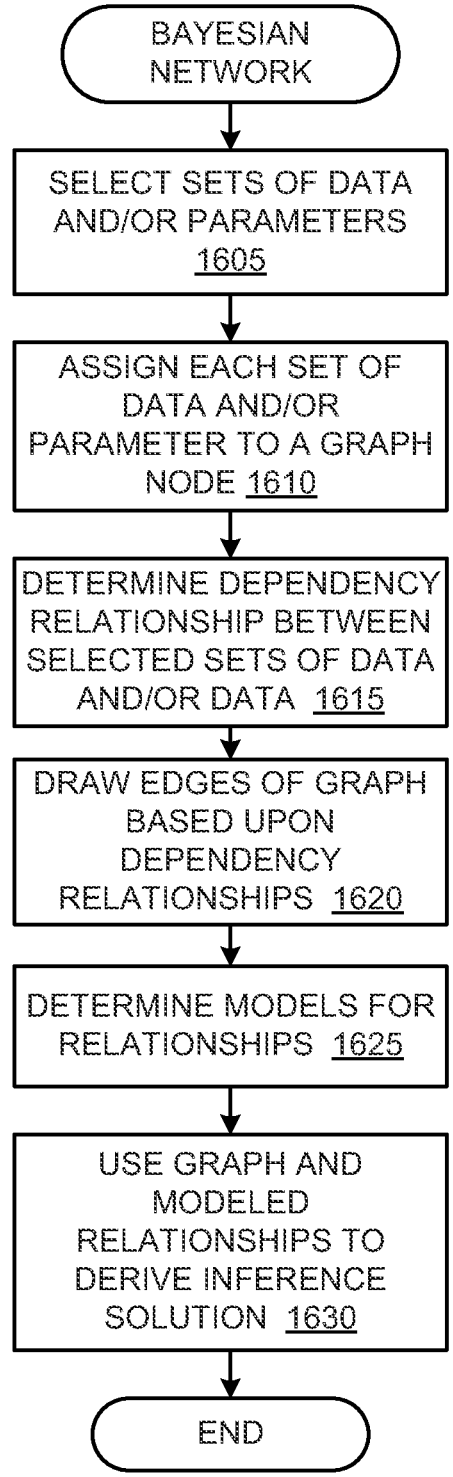
FIG. 16 is a flowchart representative of an example process that may be performed or executed to construct a Bayesian network corresponding to a communication system.

FIG. 16 is a flowchart illustrating an example process that may be carried out or performed to create a Bayesian network graph for a communication system (e.g., the example DSL system of FIG. 1). The example process of FIG. 16 begins with the selection of set(s) of data or parameters of the communication system to be represented (block 1605). For the example Bayesian network of FIG. 9, $HLOG_{ACS}$ 640, $HLOG_{ACS}$ 645 and channel attenuation per tone 605 would be selected at block 1605. The example process then assigns the selected set(s) of data or parameters to nodes of a graph (block 1610).

Dependency relationships amongst the select set(s) of data or parameters are then determined using any of a variety of method(s), technique(s) or algorithm(s) (block 1615). For example, a person knowledgeable of the example DSL system of FIG. 1 knows that the channel attenuation per tone 605 affects both $HLOG_{EMS}$ 640 and $HLOG_{ACS}$ 645. Edges are then added to the graph to represent the dependency relationships determined at block 1615 (block 1620).

As discussed above, the dependency relations are then modeled using simulated or experimental results, or by performing a basic analysis to derive the relationship between data set(s) or parameters (block 1625). For example, EQN (5) is a mathematical expression of the dependency relationship between SNR 605 and $SNR_{EMS}$ 640 of FIG. 10. As also discussed above, based on the graph and the modeled relationships, a solution that infers a desired data or parameter can then be derived (block 1630). The example process shown in FIG. 16 ends when the desired data or parameter are derived.

Figure 17:
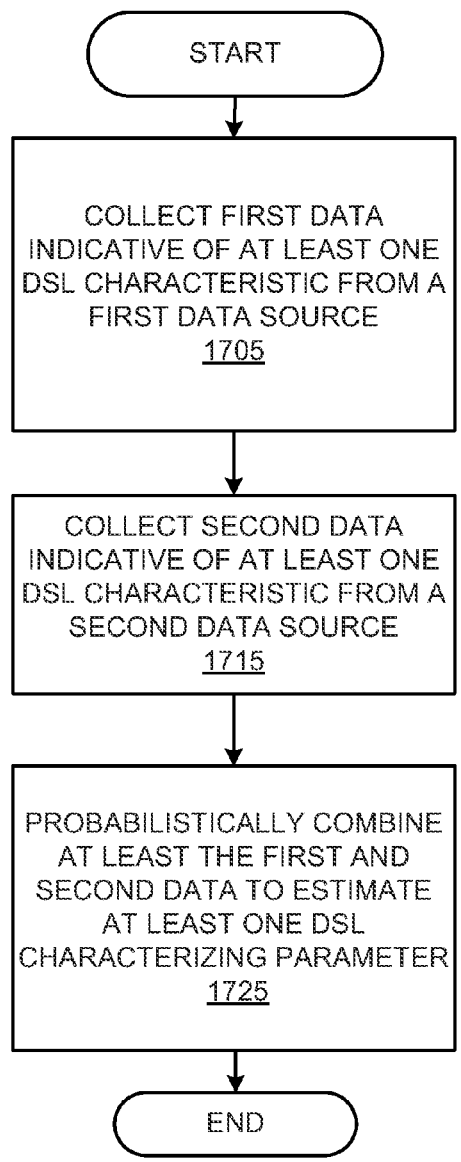
FIG. 17 is a flow chart of a method for statistically estimating at least one characterizing parameter of an exemplary DSL network or system.

FIG. 17 is a flow chart of a method for statistically inferring at least one characterizing parameter of an exemplary DSL network or system. The steps may be performed by the data collector combiner 175, however any suitable apparatus may perform the steps in any suitable order. As shown in step 1705, the data acquirer 305 collects first data 200 indicative of a characteristic of a communication system from a first data source. As shown in step 1715, the data acquirer 305 collects second data 202 indicative of another characteristic from a second data source. As shown in step 1725, the data combiner 215 statistically combines at least the first data 200 and second data 202 to infer at least one characterizing parameter 204.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware or software. Accordingly, persons of ordinary skill in the art will readily appreciate that the above described examples are not the only way to implement such systems.

At least some of the above described example methods or apparatus are implemented by one or more software or firmware programs running on a computer processor. However, dedicated hardware implementations including, but not limited to, an ASIC, programmable logic arrays and other hardware devices can likewise be constructed to implement some or all of the example methods or apparatus described herein, either in whole or in part. Furthermore, alternative software implementations including, but not limited to, distributed processing or component/object distributed processing, parallel processing, or virtual machine processing can also be constructed to implement the example methods or apparatus described herein.

It should also be noted that the example software or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other rewritable (volatile) memories; or a signal containing computer instructions. A digital file attachment to e-mail or other self-contained information archive or set of archives is considered a distribution medium equivalent to a tangible storage medium. Accordingly, the example software or firmware described herein can be stored on a tangible storage medium or distribution medium such as those described above or equivalents and successor media.

To the extent the above specification describes example components and functions with reference to particular devices, standards or protocols, it is understood that the teachings of the invention are not limited to such devices, standards or protocols. For instance, DSL, ADSL, VDSL, HDSL, G.dmt, G.hs, G.ploam, TR-069, Ethernet, DSPs, IEEE 802.11x, and IEEE 802.3x represent examples of the current state of the art. Such systems are periodically superseded by faster or more efficient systems having the same general purpose. Accordingly, replacement devices, standards or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
    a programmable processor to execute machine instructions obtained from a memory of the programmable processor to implement a data collector, the data collector operative to:
    receive first data indicative of at least one digital subscriber line (DSL) characteristic from a first data source;
    receive second data indicative of at least one DSL characteristic from a second data source, the second data source being different than, and not connected or associated with, the first data source;
    check the integrity of the first data and the second data; and
    check the consistency of the first data and the second data; and
        the programmable processor further to execute machine instructions obtained from the memory of the programmable processor to implement a data combiner, the data combiner operative to:
    logically or heuristically combine the first data and the second data; and
    probabilistically combine the first data and the second data to estimate at least one DSL characterizing parameter given at least one conditional probability.

2. An apparatus as in claim 1, wherein the data combiner operative to probabilistically combine the first data and the second data is operative to probabilistically combine the first data and the second data according to Bayes' theorem.

3. An apparatus as in claim 1, wherein the data collector comprises:
    a data acquirer operative to receive the first data and the second data;
    a data integrity checker operative to check the integrity of the first data and the second data;
    a data preprocessor operative to preprocess an output of the data integrity checker; and
    a data consistency checker operative to check the consistency of the output of the data preprocessor.

4. An apparatus as in claim 1, further comprising a database operative to store the estimated at least one DSL characterizing parameter, and a data store operative to store the first data and the second data.

5. An apparatus as in claim 1, further comprising a network management system operative to receive the at least one estimated DSL characterizing parameter and in response thereto perform at least one of: diagnose a fault, monitor a performance, estimate a performance, and determine a configuration parameter, of an associated DSL line.

6. An apparatus as in claim 1, wherein the data combiner is operative to probabilistically combine the first data and the second data to estimate the DSL characterizing parameter by applying Bayes' theorem to estimate the DSL characterizing parameter given the at least one conditional probability.

7. An apparatus as in claim 1, wherein the first data and the second data is received from at least a respectively different one of a plurality of data sources selected from a group of data sources consisting of: an auto-configuration server, a line tester system, an element management system, a service assurance system, a DSL access multiplexer, loop test equipment and a service delivery system.

8. An apparatus as in claim 1, wherein at least one of: the first data and the second data includes at least one of: a time-domain reflectometry (TDR) signal, a loop attenuation, a signal attenuation, a signal-to-noise ratio, a loop insertion loss, a bridged tap presence, a bridged tap location, a bridged tap parameter, a quiet line noise, a crosstalk noise, a data rate, an error rate, a count of code violations, a count of errored seconds, a margin, a delay, a coding parameter and a loop transfer function.

9. An apparatus as in claim 1, wherein the estimated DSL characterizing parameter is at least one of: a loop length, a loop impedance, a segment length, a cable gauge, a noise parameter, a short fault location, an open fault location, a cross fault location, a loop fault location, a bridged-tap presence, a bridged-tap location, a bridged-tap parameter, a loop attenuation, a signal-to-noise ratio, a loop insertion loss, a data rate, an error rate, a margin, a delay, a coding parameter, a loop transfer function, an impulse noise parameter, a network congestion, a spectrum management parameter, and a home distribution quality.

10. A computer-implemented method comprising:
    collecting first data indicative of at least one DSL characteristic from a first data source;
    collecting second data indicative of at least one DSL characteristic from a second data source, the second data source being different than, and unrelated to, the first data source;
    checking the integrity of the first data and the second data;
    checking the consistency of the first data and the second data;
    logically or heuristically combining the first data and the second data; and
    probabilistically combining the first data and the second data to estimate at least one DSL characterizing parameter given at least one conditional probability.

11. A method as in claim 10, wherein the first data is collected at a customer premises and the second data is collected at a service provider location.

12. A method as in claim 10, further comprising using the at least one estimated DSL characterizing parameter to at least one of: diagnose a fault, monitor a performance, estimate a performance, and determine a configuration parameter, of an associated DSL line.

13. A method as in claim 10, wherein probabilistically combining comprises applying Bayes' theorem to estimate the at least one estimated DSL characterizing parameter given the first data, the second data, and the at least one conditional probability.

14. A method as in claim 10, wherein:
    the first data is an upstream attenuation;
    the second data is a downstream attenuation; and
    the at least one estimated DSL characterizing parameter is a presence of a bridged tap.

15. A method as in claim 10, wherein:
    the first data is a bit allocation of a first system;
    the second data is a bit allocation of a second system; and
    the at least one estimated DSL characterizing parameter is a bit allocation of a third system.

16. A method as in claim 10, wherein:
the first data is a first channel transfer function from an element management system;
the second data is a second channel transfer function from an auto-configuration server; and
the at least one estimated DSL characterizing parameter is an estimated channel transfer function.

17. A method as in claim 10, further comprising:
collecting third data indicative of a status of the first data; and
collecting fourth data indicative of a status of the second data, wherein the first data is a first signal-to-noise ratio from an element management system, the second data is a second signal-to-noise ratio from an auto-configuration server, and the at least one estimated DSL characterizing parameter is an estimated signal-to-noise ratio.

18. A method as in claim 10, further comprising:
collecting third data indicative of a status of the first data; and
collecting fourth data indicative of a status of the second data, wherein the first data is a first channel transfer function from an element management system, the second data is a line test response, and the at least one estimated DSL characterizing parameter is a length of a bridged tap.

19. A method as in claim 10, further comprising:
collecting third data indicative of a status of the first data;
collecting fourth data indicative of a status of the second data; and
collecting fifth data indicative of a time of data, wherein the first data is a number of code violations function from an element management system, the second data is moving picture experts group (MPEG) statistics, and the at least one estimated DSL characterizing parameter is a packet loss rate.

20. A method as in claim 10, further comprising:
developing a Bayesian network representation, wherein probabilistically combining further comprises using the Bayesian network representation for the probabilistically combining.

21. A method as in claim 20 wherein developing a Bayesian network representation comprises:
selecting a set of parameters of a communication system that includes at least the first data, the second data and the at least one DSL characterizing parameter;
determining dependency relationships amongst the selected set of parameters; and
determining models of the dependency relationships.

22. A method as defined in claim 21, further comprising:
assigning each parameter to a node of a graph; and
drawing edges of the graph based upon the dependency relationships.

23. An article of manufacture storing machine accessible instructions which, when executed, cause one or more machines to:
collect first data indicative of at least one DSL characteristic from a first data source;
collect second data indicative of at least one DSL characteristic from a second data source, the second data source being different than, and not connected or associated with, the first data source;
check the integrity of the first data and the second data;
check the consistency of the first data and the second data;
logically or heuristically combine the first data and the second data; and
probabilistically combine the first data and the second data to estimate at least one DSL characterizing parameter given at least one conditional probability.

24. An article of manufacture as in claim 23, wherein the machine accessible instructions, when executed, cause the one or more machines to use the at least one estimated DSL characterizing parameter to at least one of: diagnose a fault, monitor a performance, estimate a performance, and determine a configuration parameter, of an associated DSL line.

25. An article of manufacture as in claim 23, wherein probabilistically combining comprises applying Bayes' theorem to statistically estimate the at least one DSL characterizing parameter given at least the first data, the second data and the at least one conditional probability.

26. An apparatus comprising:
a programmable processor to execute machine instructions obtained from a memory of the programmable processor to implement a data collector combiner, the data collector combiner operative to:
receive first data indicative of at least one digital subscriber line (DSL) characteristic from a first data source;
receive second data indicative of at least one DSL characteristic from a second data source, the second data source being different than, and unrelated to, the first data source;
logically or heuristically combine the first data and the second data; and
probabilistically combine at least the first data and the second data to estimate at least one DSL characterizing parameter, given at least one conditional probability, in response to a data integrity check of the first data and the second data.

27. An apparatus as defined in claim 26, further comprising a network management system operative to receive the at least one estimated DSL characterizing parameter and in response thereto perform at least one of: diagnose a fault, monitor a performance, estimate a performance, and determine a configuration parameter, of an associated DSL line.

28. An apparatus as defined in claim 26, wherein the data collector combiner is operative to probabilistically combine the first data and the second data to estimate the at least one DSL characterizing parameter by applying Bayes' theorem to estimate the DSL characterizing parameter given at least the first data, the second data and the at least one conditional probability.

* * * * *